(12) United States Patent
Elliott et al.

(10) Patent No.: US 9,582,398 B1
(45) Date of Patent: *Feb. 28, 2017

(54) DEBUGGING USING PRESENTATION LAYER REPRESENTATIONS OF OBJECTS

(71) Applicant: The MathWorks, Inc., Natick, MA (US)

(72) Inventors: John Elliott, Natick, MA (US); Frederick Mattsson Smith, Natick, MA (US); Yao Ren, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/570,480

(22) Filed: Dec. 15, 2014

Related U.S. Application Data

(63) Continuation of application No. 11/900,976, filed on Sep. 14, 2007, now Pat. No. 8,930,909.

(Continued)

(51) Int. Cl.
 *G06F 9/44* (2006.01)
 *G06F 11/36* (2006.01)

(52) U.S. Cl.
 CPC ....... *G06F 11/3624* (2013.01); *G06F 11/3664* (2013.01)

(58) Field of Classification Search
 USPC ........................................................ 717/125
 See application file for complete search history.

(56) References Cited

U.S. PATENT DOCUMENTS

| 5,175,856 A * | 12/1992 | Van Dyke | G06F 8/41 |
| | | | 711/E12.006 |
| 5,361,351 A * | 11/1994 | Lenkov | G06F 9/4428 |
| | | | 717/124 |

(Continued)

OTHER PUBLICATIONS

Ali-Reza Adl-Tabatabai, Thomas Gross, "Source-Level Debugging of Scalar Optimized Code", 1996 ACM; [retrieved on Oct. 20 ¬ 2011]; Retrieved from Internet <URL:http://dl.acm.org/citation.cfm?id=231388>;pp. 33-43.

(Continued)

*Primary Examiner* — Marina Lee
(74) *Attorney, Agent, or Firm* — Venable LLP; Michael A. Sartori; Ryan T. Ward

(57) ABSTRACT

Exemplary embodiments enable debugging executable code using a debugger in a computational device that provides a programming environment including a presentation layer. For example, an exemplary method includes providing a first marshalling function that receives a portion of information manipulated by the executable code and produces a presentation layer representation of the portion of the information. The presentation layer representation is compatible with a debugger that debugs the executable code. An exemplary method also includes debugging the executable code to produce a presentation layer representation of the portion of the information with the first marshalling function so as to display the presentation layer representation of the portion of the information to a user via a display device. The debugging also includes modifying the presentation layer representation of the portion of the information to produce modified information for use by the executable code, a device, or a user.

20 Claims, 17 Drawing Sheets

Related U.S. Application Data

(60) Provisional application No. 60/959,466, filed on Jul. 13, 2007.

(56) References Cited

U.S. PATENT DOCUMENTS

| | | | | |
|---|---|---|---|---|
| 5,446,900 | A | * | 8/1995 | Kimelman ............ G06F 11/362 714/1 |
| 5,535,329 | A | * | 7/1996 | Hastings ................ G06F 8/447 714/35 |
| 5,560,009 | A | * | 9/1996 | Lenkov .................. G06F 8/41 714/E11.209 |
| 5,586,323 | A | * | 12/1996 | Koizumi ................ G06F 8/447 714/E11.209 |
| 5,926,638 | A | * | 7/1999 | Inoue ................ G06F 11/3664 714/38.13 |
| 5,956,479 | A | * | 9/1999 | McInerney ......... G06F 11/3664 714/38.13 |
| 6,795,962 | B1 | | 9/2004 | Hanson |
| 6,978,218 | B1 | * | 12/2005 | Kolb ................... G06F 11/3688 702/121 |
| 6,986,124 | B1 | * | 1/2006 | Field ........................ G06F 8/30 709/230 |
| 7,478,366 | B2 | * | 1/2009 | Bickson .............. G06F 11/3664 703/6 |
| 7,661,031 | B2 | | 2/2010 | Birsan et al. |
| 7,861,225 | B2 | | 12/2010 | Lee |
| 7,904,909 | B1 | | 3/2011 | Reiner et al. |
| 8,185,877 | B1 | | 5/2012 | Colcord |
| 8,219,980 | B2 | | 7/2012 | Bates et al. |
| 8,432,398 | B2 | | 4/2013 | Rapp et al. |
| 8,443,342 | B2 | | 5/2013 | Rohde et al. |
| 8,701,092 | B1 | | 4/2014 | Colcord |
| 8,776,024 | B2 | | 7/2014 | Cabillic et al. |
| 8,930,909 | B1 | * | 1/2015 | Elliott ................. G06F 11/3664 717/124 |
| 2001/0005852 | A1 | * | 6/2001 | Bogle ................. G06F 9/45512 718/102 |
| 2002/0095660 | A1 | * | 7/2002 | O'Brien .............. G06F 11/3466 717/127 |
| 2007/0288896 | A1 | * | 12/2007 | Lee .................... G06F 11/3632 717/124 |
| 2010/0023928 | A1 | | 1/2010 | Hentschel et al. |
| 2013/0332908 | A1 | | 12/2013 | Stall et al. |
| 2015/0067654 | A1 | * | 3/2015 | Seto ........................ G06F 21/31 717/128 |

OTHER PUBLICATIONS

Cameron et al., "ViMer: A Visual Debugger for Mercury"; 2003 ACM; [retrieved on Sep. 8, 2014]; Retrieved from Internet <URL: http://dl.acm.org/citation.cfm?id=888251>;pp. 56-66.

Chapman et al., "Dragon: An Open64-Based Interactive Program Analysis Tool for Large Applications"; 2003 IEEE; [retrieved on Sep. 8, 2014]; Retrieved from Internet <URL: http://ieeexplore.ieee.org/stamp/stamp.jsp?tp=&arnumber=1236416>;pp. 792-796.

Costigan, "Applying information visualization techniques to visual debugging", Master thesis, Virginia Polytechnic Institute and State University; [retrieved on Mar. 20, 2012]; Retrieved from Internet <URL: http://scholar.lib.vtedu/theses/available/etd-01682003-021954/unrestricted/ivdthesis.pdf>; pp. 1-106.

IBM, "A Java-Based Debug Model", IBM research disclosure, Nov. 1998; [retrieved on Mar. 20, 2012]; Retrieved from East search; pp. 1-3.

Lueck, et al., "PinADX: An Interface for Customizable Debugging with Dynamic Instrumentation"; 2012 ACM; [retrieved on Sep. 8, 2014]; Retrieved from Internet <URL: http://dl.acm.org/citation.cfm?id=2259019>;pp. 114-123.

Norman Ramsey, David Rhanson, "A Retargetable Debugger", Jun. 1992, Proceedings of the SIGPLAN'92 Conference on Programming Language Design and Implementation, [retrieved on Jun. 21, 2011]; Retrieved from Internet <URL:http://citeseerx.ist.psu.edu/viewdoc/download?doi=10.1.1.34.8481&rep=rep&type=pdf>; pp. 1-10.

Sukyoung Ryu, Norman Ramsey, "Source-Level Debugging for Multiple Languages with Modest Programming Effort" 2005, Springer-Verlag Berlin Heidelberg, [retrieved on Jun. 21, 2011]; Retrieved from Internet <URL:http://www.springerlink.com/content/pkvuwx7wv968u3dk/fulltext.pdf>; pp. 10-26.

Thane, et al., "Replay Debugging of Real-Time Systems Using Time Machines"; 2003 IEEE; [retrieved on Sep. 8, 2014]; Retrieved from Internet <URL: http://ieeexplore.ieee.org/stamp/stamp.jsp?tp=&arnumber=1213515>;pp. 1-8.

\* cited by examiner

STEP 630

Provide a first marshalling function
for use with the executable code

Compile code in a debug mode to generate one or more marshalling functions, the one or more marshalling functions including the first marshalling function, 632

Instruct a compiler to generate at least one marshalling function, the at least one marshalling function including the first marshalling function, 634

*Fig. 6D*

DEBUGGING USING PRESENTATION LAYER REPRESENTATIONS OF OBJECTS

RELATED APPLICATIONS

This patent application is a continuation of U.S. patent application Ser. No. 11/900,976 filed on Sep. 14, 2007, now U.S. Pat. No. 8,930,909, which is a non-provisional application claiming priority to U.S. Provisional Patent Application No. 60/959,466, filed Jul. 13, 2007. Each of the above-identified applications is hereby incorporated herein by reference in its entirety.

BACKGROUND

A debugger is software that identifies "bugs" in a program as the program is developed. As used herein a "bug" is any behavior in a program that is not what the program is intended to do. The debugger further helps a programmer to fix program code that does not operate in a desired manner. Typically, a debugger allows the programmer to monitor the program as the program executes. The programmer may modify instructions in the program using the debugger. Furthermore, the programmer may use the debugger to modify values stored in memory for the program.

The debugger may further allow the programmer to start and stop execution of the program in multiple ways. For example, the debugger may enable the programmer to insert breakpoints in the program that halt execution of the program at the locations where the breakpoints are inserted. The debugger may further allow the programmer to view values of variables and other objects at the breakpoints. For example, the programmer can view the state of the program at each breakpoint and thus, gather valuable information regarding how the program behaves.

The debugger may further allow the programmer to start and stop program execution via a technique called "single stepping." With single stepping, a single statement in the program is executed then program execution is halted. Then, the next statement is executed and program execution is halted. This process may repeat as long as single stepping is active or until the end of the program is reached.

Debuggers may require that the program be available in executable form for the program to be executed. In many instances, a compiler will generate this executable form of the program. The compiler builds a symbol table when compiling the program. The symbol table is a data structure that holds information regarding each identifier in the program. The information may include type, size, and memory location of each object that is identified by an identifier in the program and is specific to the programming language in which the program is written.

The debugger may access information in the symbol table to display information regarding an object in the program. For example, the debugger may display a value for an object when program execution is halted. To display the object's value, the debugger may need to locate and read the language-specific representation of the value of the object which is stored in memory, and convert the information into a representation that the debugger can understand (e.g. a "source code representation"). Based on the information in the symbol table, the debugger determines the data type (language-specific), size and memory location of the representation of the object. The debugger reads the value of the language-specific representation of the object at the memory location specified by the symbol table. The debugger uses the type definition for the type specified for the object in the symbol table to format and display the value of the object. A debugger may use its own conversion to read from the symbol table to convert the language-specific representation of the object to source code representation. The debugger then displays the source code representation of the object using a presentation layer in the debugger, where the presentation layer is a component that displays information to the user and/or that accepts information from the user.

In addition to accessing the symbol table to display a value of an object, the debugger may also access the symbol table to modify a value of an object when program execution is halted. For example, when the programmer provides a modified value of an object (such as a variable) through the presentation layer of the debugger, the debugger receives the value in a format that is native to the debugger (e.g. the source code representation). The debugger uses the information in the symbol table and the debugger's conversion function to convert the modified value in the source code representation of the object into a corresponding modified value of the language-specific representation of the object.

SUMMARY

An exemplary embodiment provides a method for debugging a program using a debugger in a computational device including a display and a memory, where the computation device provides a programming environment including a presentation layer. The method includes obtaining a first language-specific representation of an object from the memory. The method also includes obtaining a first presentation layer representation of the object, and using the first presentation layer representation of the object in the debugger to display information about the object to a user.

According to further aspects of an exemplary embodiment, obtaining a first presentation layer representation of the object may include creating a first presentation layer representation of the object in memory using a first marshalling function. Obtaining a first presentation layer representation of the object may include performing an operation on the first language-specific representation of the object, the operation creating a first presentation layer representation of the object in the memory. The first presentation layer representation may be a programming language-independent representation, where a programming language-independent representation is not specific to a programming language of the program being debugged. The first presentation layer representation may be a programming environment presentation layer representation. The operation on the first language-specific representation of the object may be performed by a first marshalling function.

According to other aspects of an exemplary embodiment, the method may further include instructing a compiler to generate at least one marshalling function, the at least one marshalling function including the first marshalling function. The at least one marshalling function may be automatically generated by a compiler when a source program is compiled in a debug mode, where the at least one marshalling function includes the first marshalling function. The at least one marshalling function, which converts between a language-specific representation of the object and a presentation layer representation of the object, may be generated by an interpreter. The at least one marshalling function, which converts between a language-specific representation of the object and a presentation layer representation of the object, may be generated by a translator.

According to further aspects of an exemplary embodiment, the method may further include loading and executing the at least one marshalling function in a processing environment of the program. The method may further include loading and executing the at least one marshalling function in a separate processing environment from a processing environment of the program.

According to another aspect of an exemplary embodiment, using the first presentation layer representation of the object in the debugger may include displaying the first presentation layer representation of the object in a graphical user interface (GUI) while the program is executing, where the GUI is associated with the presentation layer.

According to other aspects of an exemplary embodiment, the method may also include creating a second presentation layer representation of the object by altering the first presentation layer representation of the object, obtaining an altered first language-specific representation of the object corresponding to the second presentation layer representation of the object, executing the program using the altered first language-specific representation of the object. Obtaining an altered first language-specific representation of the object may include creating an altered first-language specific representation of the object using a second marshalling function. Obtaining an altered first language-specific representation of the object may include operating on the second presentation layer representation of the object to produce an altered first language-specific representation of the object. The operation on the second presentation layer representation of the object may be performed by a second marshalling function.

An exemplary embodiment provides a method for debugging executable code. The method includes providing a first marshalling function for use with the executable code. The first marshalling function receives a portion of information manipulated by the executable code and produces a presentation layer representation of the portion of the information. The presentation layer representation of the portion of the information is compatible with a debugger that debugs the executable code. The method also includes debugging the executable code. The debugging includes producing a presentation layer representation of the portion of the information with the first marshalling function to display the presentation layer representation of the portion of the information to a user via a display device. The debugging may also include displaying the presentation layer representation of the portion of information in a graphical user interface (GUI) associated with a presentation layer of a programming environment, according to an aspect of an exemplary embodiment. The debugging also includes modifying the presentation layer representation of the portion of the information to produce modified information for use by the executable code, a device, or a user. The method may be implemented on a computing device with a programming environment including a presentation layer.

According to aspects of an exemplary embodiment, the debugging may further include sending the portion of the information to a destination, wherein the portion of the information is sent using the presentation layer representation of the portion of the information or using another representation of the portion of the information that differs from the presentation layer representation. The debugging may also include storing the presentation layer representation of the portion of the information in a storage device.

The method may also include providing a second marshalling function for use with presentation layer representations of information, wherein the second marshalling function receives a presentation layer representation of information and produces corresponding information in a format compatible with the executable code. The debugging may include producing modified information from the modified presentation layer representation with the second marshalling function and modifying the executable code using the modified information.

According to other aspects of an exemplary environment, the method may also include instructing a compiler to generate at least one marshalling function, where the at least one marshalling function includes the first marshalling function.

The method may further include compiling a program in a debug mode using the debugger to generate one or more marshalling functions that include the first marshalling function$_{[AmB2]}$.

Another aspect of an exemplary embodiment is a medium for use with a computing device holding instructions executable by the computing device for debugging a program using a debugger by performing any of the aforementioned methods.

Yet another aspect of an exemplary embodiment includes a system for debugging a program using a debugger. The system includes an electronic device with a display and memory. The system also includes a programming environment with a presentation layer. The system further includes a debugger that includes a retrieving mechanism for obtaining a language specific representation of an object in the memory and a representation conversion mechanism for using the language-specific representation of the object in the memory to obtain a presentation layer representation of the object in the memory. The debugger also includes a display mechanism for using the presentation layer representation of the object to display information about the object to a user.

BRIEF DESCRIPTION OF THE DRAWINGS

The accompanying drawings, which are incorporated in and constitute a part of this specification, illustrate one or more embodiments of the invention and, together with the description, explain the invention. In the drawings, FIG. 1A schematically illustrates a program, a conventional debugger for debugging the program, a conventional symbol table associated with the program, and a display to display information about program objects;

FIG. 6D is a flow chart illustrating steps that may be included in the technique depicted in FIG. 6C, according to aspects of an exemplary embodiment;

DETAILED DESCRIPTION

Figure 1A:
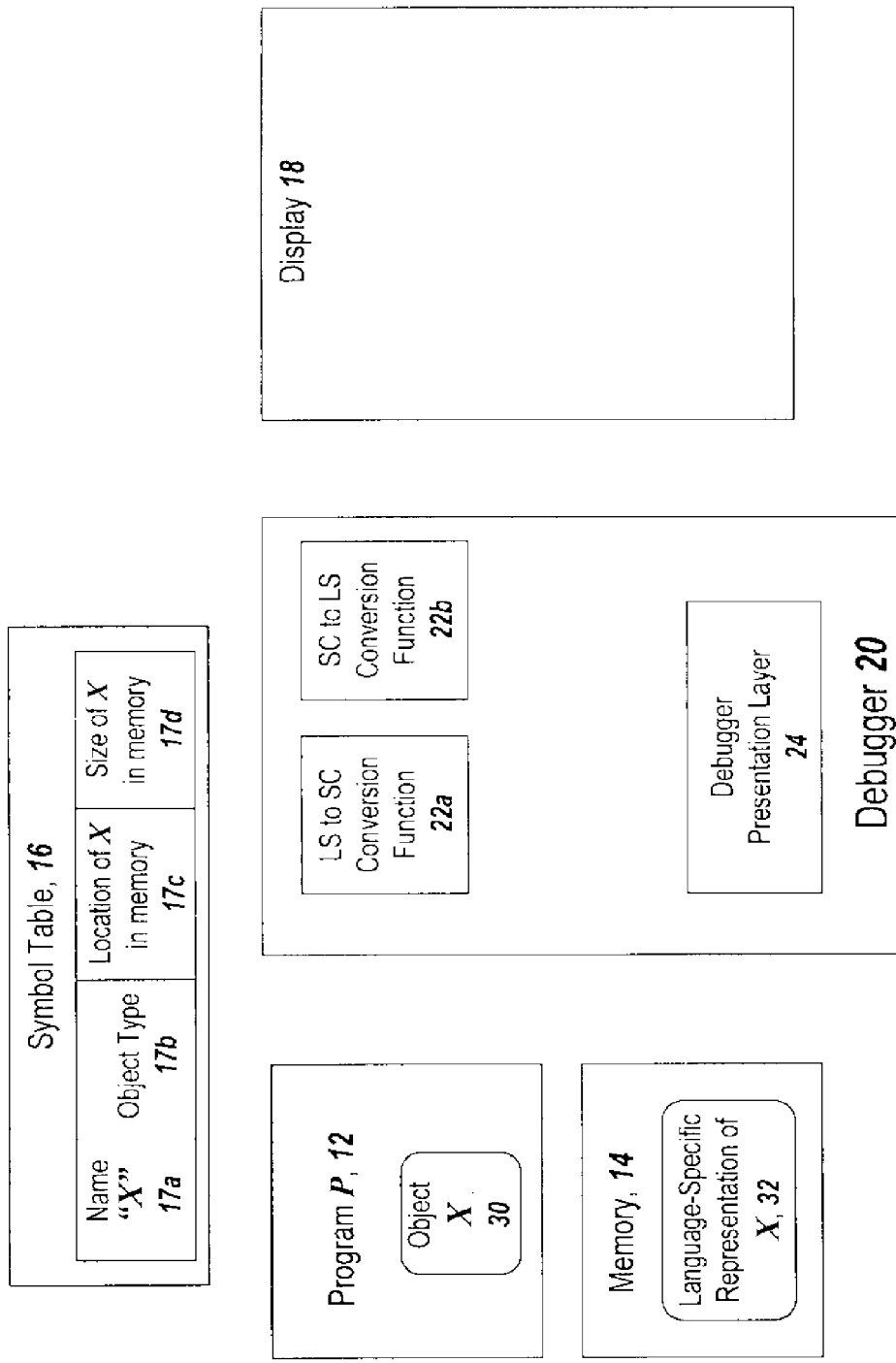
FIG. 1B schematically illustrates displaying a value of a program data object using a debugger of the prior art.

A conventional debugger that supports a specific language may be configured to recognize all the object "types" generated by the compiler for the specific language. Information regarding the "type" of each object in a program may be stored in a symbol table that is associated with the program and generated by the compiler. For example, a conventional debugger may need to work with all of the object "types" that may appear in the symbol table to format and display a given program object value. As the specific language is modified to include a new object type, the conventional debugger may be modified to work with the new object types. If a debugger needs to support a new language with a type system that differs from a type system of the language (or languages) that the debugger currently supports, then the debugger may need to be modified to support the new language. Thus, conventional debuggers that directly support language-specific object types may be sensitive to changes in supported languages and may be limited in the number of languages that any one debugger can support.

In contrast, a debugging technique (e.g., a debugging method) of an exemplary embodiment may use a target-language compiler to create marshalling functions that convert between language-specific representations of data objects and presentation-layer representations of data objects. For example, one embodiment may directly convert between language specific representations and presentation layer representations of data objects. This direct conversion may eliminate the need for language-specific conversion functions in the debugger. In a debugging technique of an exemplary embodiment, display and manipulation occurs with the data objects in the form of presentation-layer representations. Presentation-layer representations are opaque data objects, meaning that the presentation-layer representations of data objects may all behave in the same manner, regardless of the language of the program source code being debugged. Because an exemplary debugging technique works with opaque presentation-layer representations of data objects, the debugger does not need to know the details associated with the language-specific object types. For example, the debugger may work with any compiler where the debugger has access to suitable conversion operations for converting to and from opaque representations of data objects and language-specific representations of data objects produced by the compiler. Suitable conversion operations include an operation that produces a presentation layer (opaque) representation of an object from a language-specific representation of the object and an operation that produces a language-specific representation of an object from an (opaque) presentation layer representation of the object.

According to an aspect of an exemplary embodiment, the compiler for a target programming language may be used to produce marshalling functions which perform the aforementioned operations. A debugging technique of an exemplary embodiment is flexible, because modifications to object types in languages supported by the debugging technique, or incorporation of new languages to be supported by the debugging technique, does not require modification of the debugging technique. Unlike conventional debuggers that usually require specific knowledge of the type system of the target language, an exemplary debugging technique may automatically support multiple languages, multiple compilers and/or multiple type systems because the exemplary debugging technique works with opaque data types that are programming language independent.

An exemplary embodiment may reduce the overhead associated with a conventional debugger when used in a programming environment that includes a presentation layer. Some programming environments include a presentation layer for the creation and manipulation of data objects. Conventional debuggers typically include a data object presentation layer, which is separate from the presentation layer of the programming environment. A conventional debugger that includes a data object presentation layer in addition to the presentation layer of the programming environment may result in large overhead for an overall system that includes the debugger and the programming environment due to the two separate data object presentation layers. In contrast, an exemplary embodiment may eliminate the need for a separate presentation layer in the debugger by leveraging the presentation layer of the programming environment. For example, an exemplary embodiment may employ a debugger that uses the presentation layer of the programming environment to display and/or modify objects of a program under test. Each language supported by the programming environment can have language-specific mechanisms for converting between presentation-layer representations of objects and language-specific representations stored in memory. These language-specific mechanisms may allow the debugger to deal only with opaque objects passed between the presentation layer and the program under test, where opaque objects are not language-specific. The use of opaque objects may relieve the debugger from having to directly support language-specific object representations and/or language-specific types.

Exemplary embodiments may allow a debugger to support many different programming languages without requiring that the debugger directly support each language-specific type in every supported language. Because the debugger does not directly support language-specific types the debugger may be more reliable, easier to write and more extensible than conventional debuggers. In addition, because the debugger does not directly support language-specific types the debugger may be faster than conventional debuggers. In a programming environment with a presentation layer, the debugger may reduce overhead that is associated with a separate debugging presentation layer for conventional debuggers.

Executable code manipulates information when run. As used herein, a data object is any portion of said information that a programmer or user would like to access, view or modify in the debugging process. Examples of portions of information contained in executable code that are data objects include, but are not limited to, values of variables, constants, etc.

FIG. 1A schematically illustrates a program "P" 12, a conventional debugger 20 for debugging program 12, a conventional symbol table 16 associated with the program 12, and a display 18 to display information about program objects. A conventional debugger may acquire and display a value of a program object (such as a variable) during halted execution of a program. In FIG. 1A, exemplary program 12 that includes object "X" 30 is being executed on a computing device with memory 14 and a display 18. During execution, a language-specific representation 32 of object 30 is stored in the memory 14. Conventional debugger 20 has access to conventional symbol table 16 associated with program 12. If program 12 has been compiled, conventional symbol table 16 may have been generated by a compiler when program 12 was compiled. Conventional symbol table 16 may contain information relating to one or more data objects in program 12, such as the object name 17a, the object type 17b, the location of the value of the object in memory 17c, and the size of the object in memory 17d. Conventional debugger 20 may include two built-in conversion functions for each object type in the language supported by the debugger 20. For a specific object type, one built-in conversion function 22a converts a language-specific (LS) representation of an object to a source code (SC) representation of the object, and the other built in conversion function 22b converts the source code representation of the object to the language-specific representation of the object. Conventional debugger 20 also includes debugger presentation layer 24 for displaying a value of an object.

Figure 1B:
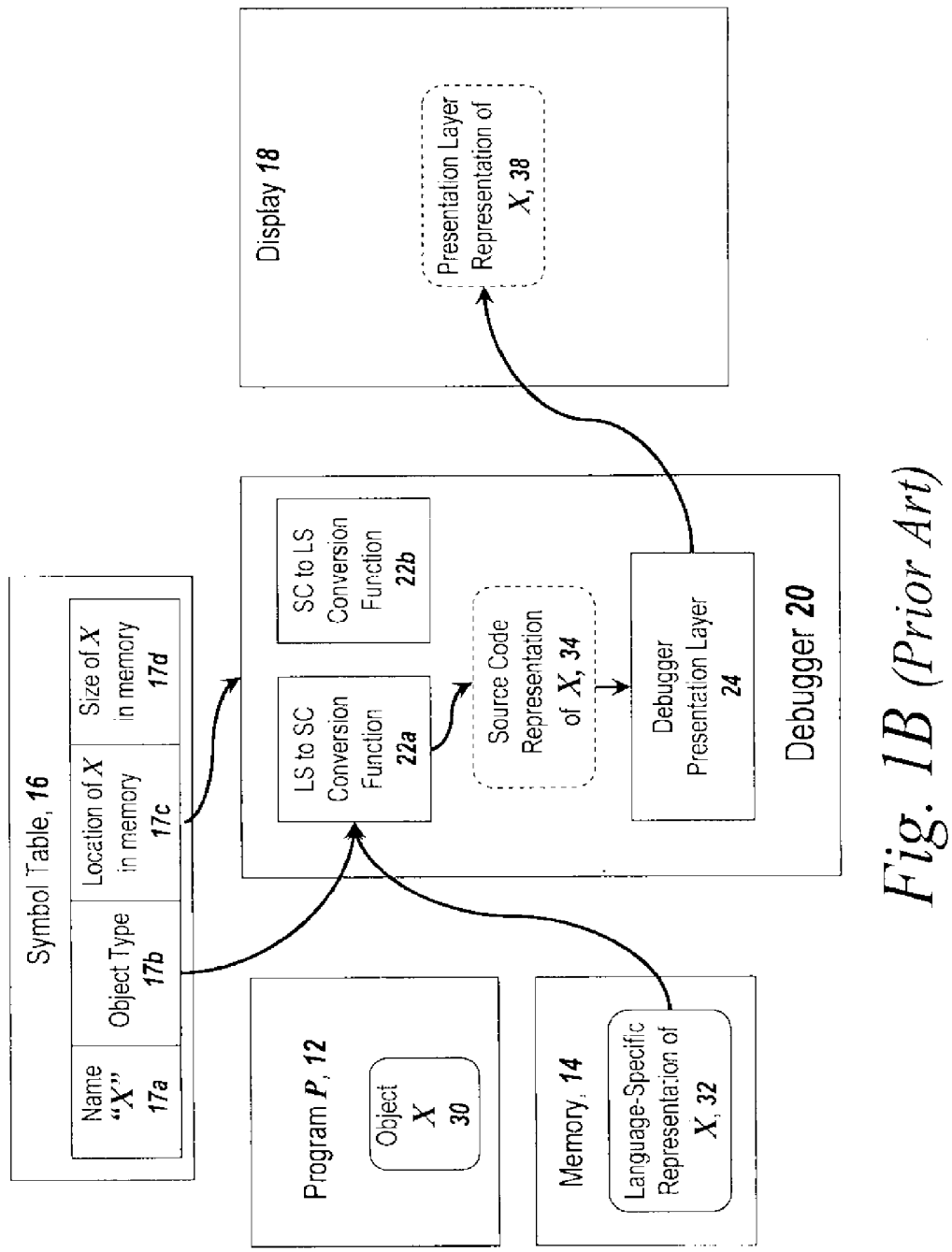

FIG. 1B schematically illustrates the conventional debugger 20 acquiring a value of program object 30 and displaying a presentation layer representation 38 of object 30 on the display 18. During debugging, execution of program 12 may be halted and a programmer may request to see a value of program object 30. In response, conventional debugger 20 will read information from conventional symbol table 16 including the object type 17b, and the address 17c of the location of a language-specific representation 32 of object 30 in memory 14. Debugger 20 then goes to the address 17c in memory 14 and reads the value of language-specific representation 32. Debugger 20 creates a source code representation 34 of the object 30 by sending language specific representation 32 read from memory 14 and the object type 17b read from conventional symbol table 16 to the LS to SC conversion function 22a. The LS to SC conversion function 22 outputs a source code representation 34 of object 30. The dotted box indicates that source code representation is not an element of conventional debugger 20, but is created by conventional debugger 20 during debugging. Source code representation 34 is then sent to debugger presentation layer 24 which displays a presentation layer representation 38 of object 30 on the display 18. Conventional debugger 20 may include built in LS to SC conversion functions 22a and SC to LS conversion functions 22b for all object types in all supported program languages. Changes to object types in a supported program language may require modification of conversion functions or addition of new conversion functions to conventional debugger 20 because conversion functions 22a and 22b are specific to the object types of the supported program languages. Conventional debugger 20 may require a debugger presentation layer 24 to display presentation lay representation 38 on the display 18.

Figure 2A:
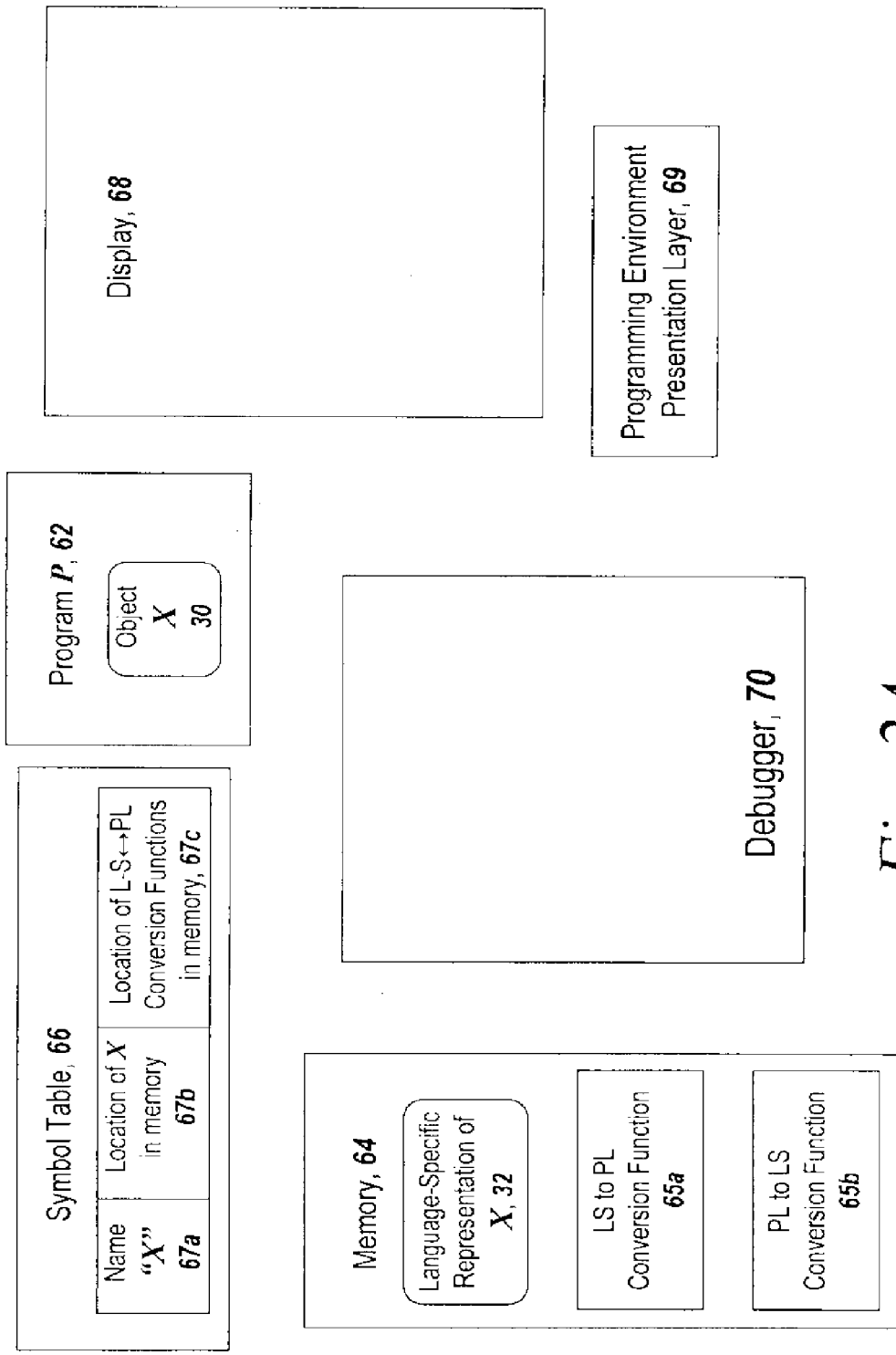
FIG. 2A schematically illustrates an exemplary embodiment that allows a user to interact with program objects.

FIG. 2A schematically illustrates a program 62, an exemplary debugger 70 for debugging program 62, an exemplary symbol table 66 associated with program 62, a programming environment presentation layer 69 and a display 68 to display information about program objects. Program 62 includes object "X" 30. A language-specific (LS) representation 32 of object 30 is stored in memory 64. Memory 64 also holds a conversion function that converts the language-specific representation 32 of the object to a presentation layer (PL) representation of the object, LS to PL conversion function 65a, and a conversion function that converts the presentation layer representation of the object to the language-specific representation 32 of object 30, PL to LS conversion function 65b. Exemplary symbol table 66 includes the object name 67a, the location 67b of the object in memory 64, and locations 67c of conversion functions in memory. Exemplary debugger 70 is depicted in communication with a programming environment presentation layer 69. In contrast to conventional debugger 20, exemplary debugger 70 does not include conversion functions between a language-specific representation and a source code representation (LS to SC and SC to LS). In further contrast to conventional debugger 20, exemplary debugger 70 does not include a presentation layer separate from programming environment presentation layer 69.

Figure 2B:
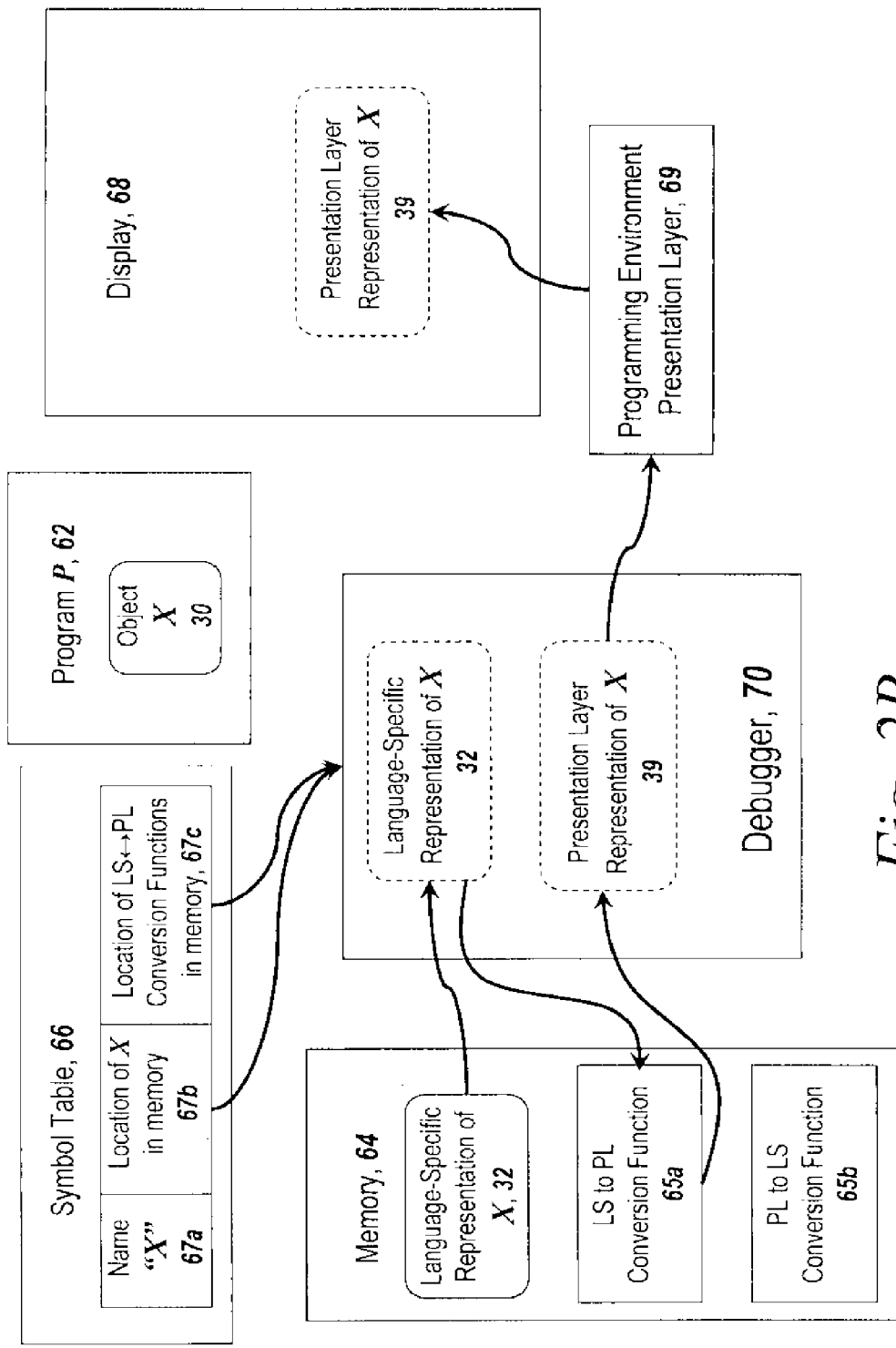
FIG. 2B schematically illustrates displaying a value of a program data object using an exemplary embodiment of a debugger.

FIG. 2B schematically illustrates exemplary debugger 70 acquiring a value of program object 30 and displaying a presentation layer representation 39 of object 30 on the display 68. When the programmer requests display of the value of program object 30 while program execution is halted, debugger 70 reads information from the symbol table 66 associated with the program 62. The symbol table 66 contains information about each object including the name 67a, and the location of the object in memory 67b. In this instance, the symbol table 66 also contains a location 67c of LS to PL and PL to LS conversion functions 65a, 65b in memory 64. The debugger 70 reads the location of X in memory 67b and the location 67c of the LS to PL conversion function 65a for object 30. The LS to PL conversion function 65a for object 30 implicitly includes information regarding the type of object 30 and the size of object 30 in memory, thus, the object type of X and size of X need not be directly stored in the symbol table 66. The debugger 70 then reads in the value of language specific representation 32 stored in memory 64 and sends language-specific representation 32 to LS to PL conversion function 65a. LS to PL conversion function 65a outputs a presentation layer representation 39 of object 30. The debugger 70 sends presentation layer representation 39 to the programming environment presentation layer 69 and instructs the programming environment presentation layer 69 to display presentation layer representation 39 on the display 68.

The exemplary debugger 70 of FIG. 2B may not include any conversion functions to convert between different representations of the object. Conversion functions that convert between different representations of the object may be generated outside of exemplary debugger 70 and accessed by exemplary debugger 70 without being included in exemplary debugger 70. The LS to PL and PL to LS conversion functions 65*a*, and 65*b* are associated with the compiled program 62 and can be generated by a compiler that was used to compile the program. Because exemplary debugger 70 does not include language-specific conversion functions, changes in supported object types may not necessitate changes to exemplary debugger 70.

The exemplary debugger 70 may not include a presentation layer. Instead the exemplary debugger 70 uses the programming environment presentation layer 69 to display the presentation layer representation 39 of object 30. The dotted boxes around language specific representation 32 and presentation layer representation 39 indicate that these representations are generated or used in exemplary debugger 70 and display 68, but are not components of exemplary debugger 70 or display 68. The dotted boxes also indicate that the language-specific representation 32 and the presentation layer representation 39 are not residing in debugger 70, but that debugger 70 has access to an address in memory of language-specific representation 32 and presentation layer representation 39, access to an address in memory of a copy of language-specific representation 32 and presentation layer representation 39, and/or a copy of values of language-specific representation 32 and presentation layer representation 39.

Figure 3A:
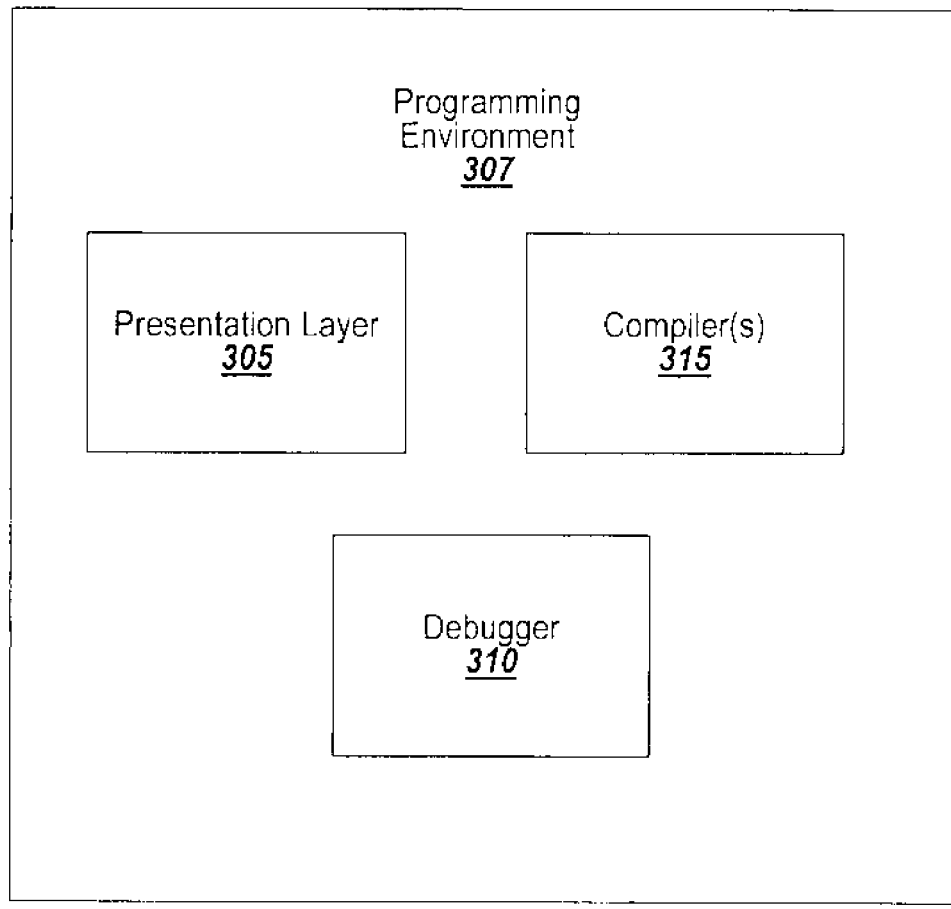
FIG. 3A is a schematic diagram of an exemplary programming environment that includes an exemplary debugger.

An exemplary embodiment may be related to a programming environment 307 as illustrated in FIG. 3A. Programming environment 307 supports the design and modification of applications and other executable processes (e.g., code). Programming environment 307 may be command line driven and/or graphical. In programming environment 307, programs are written in one or more languages that may be any of textual/or graphical. Programming environment 307 may also support any of compiling, debugging, translating, executing, running, and simulating an application or other executable process as well as supporting presentation of program information. Exemplary programming environments may include environments provided by the MATLAB and SIMULINK software of The MathWorks, Inc, as well as environments provided by other manufacturers.

Programming environment 307 may include a presentation layer 305. A presentation layer, as used in this context, is a software component that displays information to a user or accepts input from a user. A presentation layer representation of an object is the representation that the presentation layer can use to serialize the object to and from a graphical user interface 715, a network interface 718, a storage 708, and other devices such a computer monitor, a keyboard, the installation medium 716, a disk drive, a printer etc (see also FIG. 7A). For example, in one embodiment, the presentation layer can directly serialize the object. An example of a presentation layer representation is an mxArray in MATLAB.

Programming environment 307 may also include one or more compilers 315. A compiler 310, as incorporated into an exemplary embodiment, is a computer program or set of programs that translates text and/or syntax written in a computer language (the source language) into another computer language (the target language). The original sequence may be called the source code and the output may be called the object code. For example, compiler 310 may translate source code from a high level language (e.g., C, C++, Perl, etc.) to a lower level language (e.g., object code, etc.). Compiler 310 may include a program or programs that translate between high level languages (also known as language translators, source to source translators and language converters). An exemplary embodiment may incorporate any of a native-code compiler, which generates output intended to run on the same type of computer and operating system (platform) as the compiler itself runs on, a cross-compiler, which generates output designed to run on a different platform than that of the compiler, and/or a virtual machine compiler. Additionally, an exemplary embodiment also encompasses interpreters. An interpreter directly executes a high level program without preliminary translation into machine code.

Figure 3B:
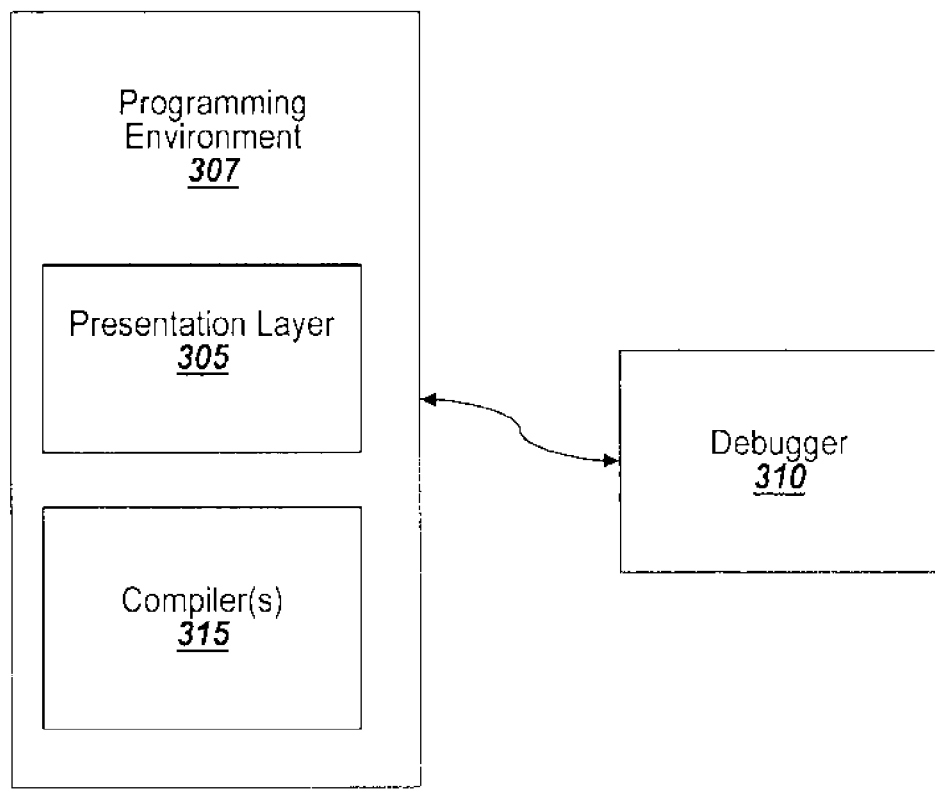
FIG. 3B is a schematic diagram of a programming environment and an exemplary debugger in which the debugger is outside the programming environment.

As depicted in FIG. 3A, a debugger 310 operates within programming environment 307. Alternately, debugger 310 may operate from outside the programming environment 307 as illustrated in FIG. 3B. Again, programming environment 307 includes a presentation layer 305 and one or more compiler(s) 315. Debugger 310 operates from outside programming environment 307 and communicates with programming environment 307.

Figure 3C:
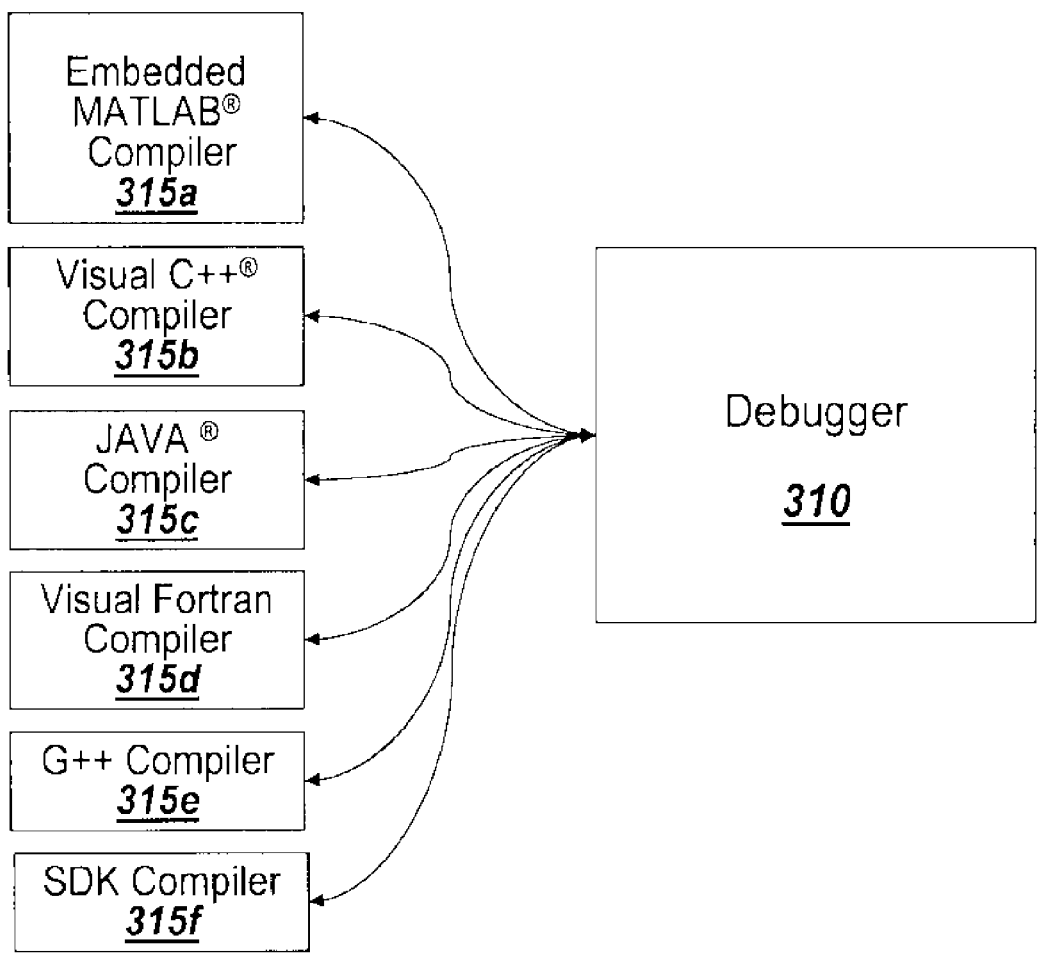
FIG. 3C is a schematic diagram illustrating the interaction of various computer language compilers and a debugger according to an exemplary embodiment.

FIG. 3C illustrates the connection between a debugger 310 and compilers 310 for various languages, according to an aspect of an exemplary embodiment. Debugger 310 may operate from within the programming environment 307 as depicted in FIG. 3A or may operate from outside the programming environment 307 as depicted in FIG. 3B. As depicted in FIG. 3C, exemplary debugger 310 may work with compilers for a variety of languages such as: an embedded MATLAB compiler 310*a*, a Visual C++® compiler 310*b*, a JAVA® compiler 310*c*, a Visual FORTRAN compiler 310*d*, a G++ compiler 310*e* and an SDK compiler 310*f*. For example, debugger 310 may be used to debug programs written in different programming languages, such as MATLAB programming language, Visual C++®, a JAVA®, FORTRAN, etc. Debugger 310 may use opaque data objects and may not directly support language specific data objects. As a result, exemplary debugger 210 may support any number of different languages and need not be modified when object types in the supported programming languages are modified or added.

An example programming environment, the Simulink® software product, from The MathWorks, Inc. of Natick, Mass., provides a graphical modeling environment and programming environment with a presentation layer. Within SIMULINK, users may employ Embedded MATLAB language (EML) to define the function of a "block" program written in EML that may be compiled, debugged and run by a user within the SIMULINK environment. The EML program may be compiled from EML into C code by the EML compiler. The EML compiler may produce marshalling functions that convert between a C representation of an object and a MATLAB representation of that object.

Figure 4A:
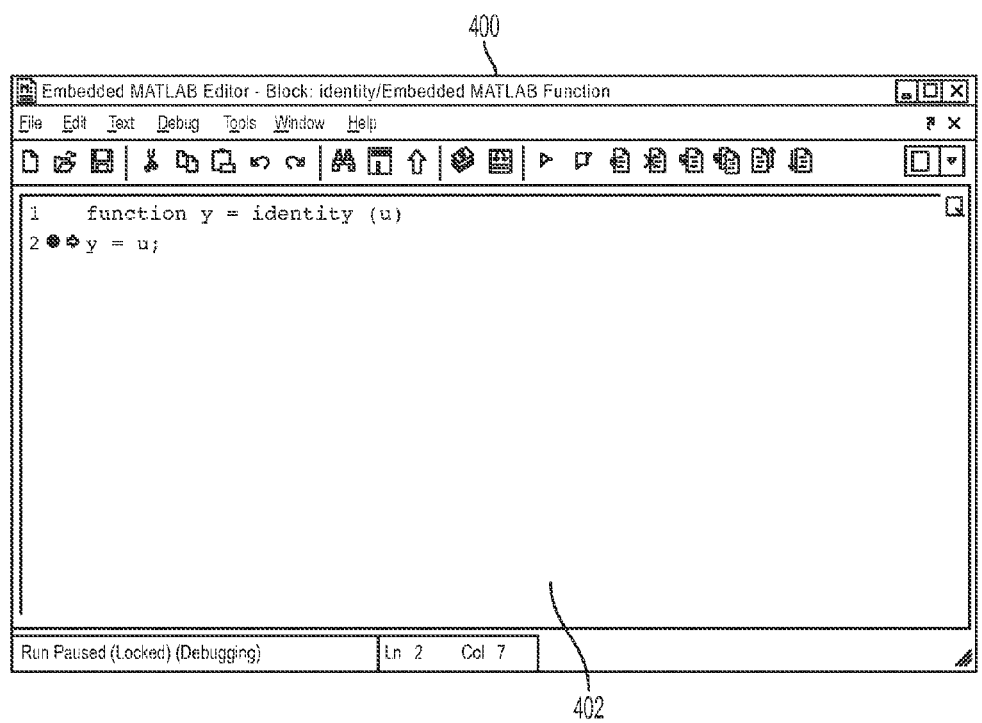
FIG. 4A illustrates a portion of the user interface for an exemplary debugger, according to an aspect of an exemplary embodiment.

FIG. 4A depicts a portion of a user interface 400 for a programming environment 307 that can be used with debugger 310. A sample program depicted in FIG. 4A that consists of one function (an identity function) is used in describing debugger 310. The program to be debugged (the identity function) is displayed in program window 402. An identity function in the MATLAB M programming language is a function that given an object will return a copy of the object:
function y=identity (u)
y=u;
The identity M function is a polymorphic function meaning that it can take an object of any data type as input. The embedded MATLAB language (EML) compiler can be used to compile the identity M function to C code that accepts only a particular data type, such as a real, scalar value of class double.

Figure 4B:
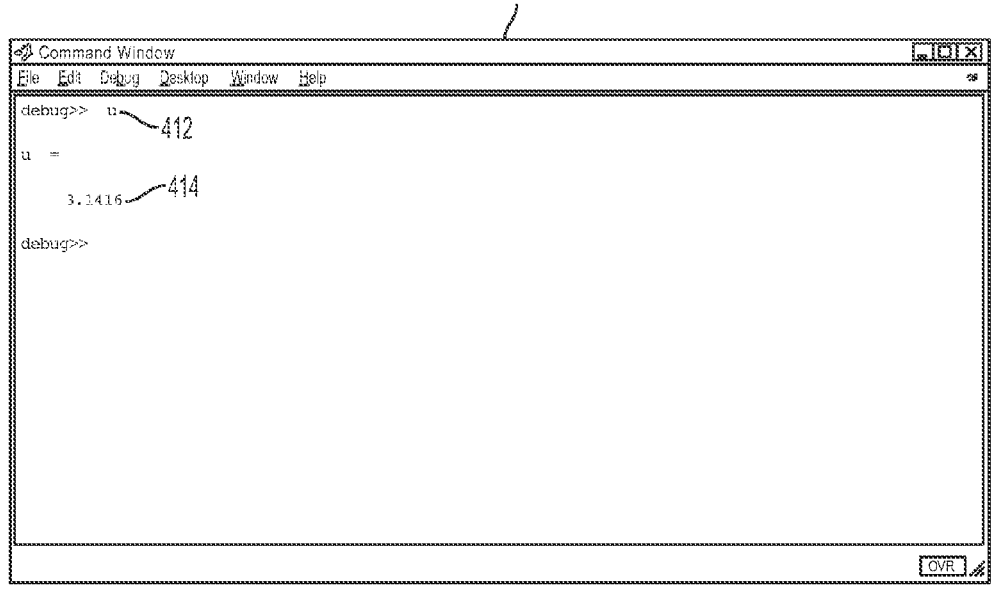
FIG. 4B illustrates a command window in which a user may request display of a value of a program variable, according to an aspect of an exemplary embodiment.
Figure 4C:
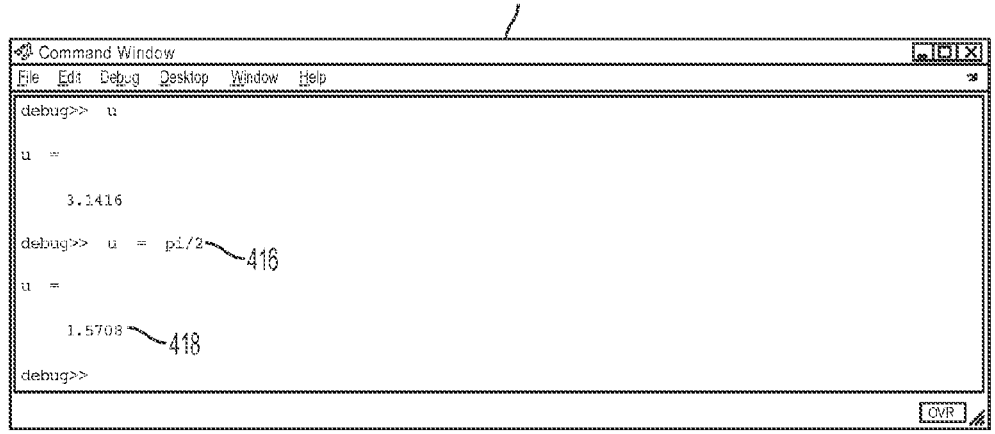
FIG. 4C illustrates a command window in which a user may alter a value of a first presentation layer representation of a variable, according to an aspect of an exemplary embodiment.

FIGS. 4B and 4C depict a command window 410 and illustrate displaying a value of a program object and changing a value of a program object respectively. When program execution is stopped in debugger 310, the programmer may request display of an object's value through the graphical user interface. The programmer may request display by hovering over a symbol corresponding, by employing a mouse cursor, by typing the object's name and/or may use other suitable techniques. In FIG. 4B a programmer has requested display of the value of object "u" by typing the object's name ("u") 412 in command window 410. In response, a value of object "u" 414 is displayed in the command window 410. In FIG. 4C a programmer has entered a different value 416 for object "u". Command window 410 displays output 418 indicating that the different value 416 has been assigned to object "u".

In FIGS. 4A and 4B, when the programmer requests display of the program object "u", the programmer calls the compiled language-specific (e.g., C) version of the identity function from a programming environment (e.g., a programming environment provided by MATLAB software) and wants the result of the function call displayed in the presentation layer of the programming environment. The programming environment representation of an object, such as object "u", is a presentation layer representation. For example, the programming environment provided by MATLAB software is designed to display MATLAB representations of objects. The language-specific representation of an object, such as object "u", stored in memory may also be referred to as a run-time representation of the object. As depicted in FIGS. 2A and 2B exemplary debugger 70 uses a LS to PL conversion function 65a and a PL to LS conversion function 65b to convert between a language specific representation 32 and a presentation layer representation 39 of an object. An exemplary debugger may use marshalling functions to convert between representations of program objects for displaying values of the program objects and allowing users to change runtime values of the program objects. A marshalling function converts between different representations of an object. For example, the Embedded MATLAB Coder Compiler (EMCC) uses marshalling functions to convert between a MATLAB representation of an object and a C runtime representation of the object.

Figure 5:
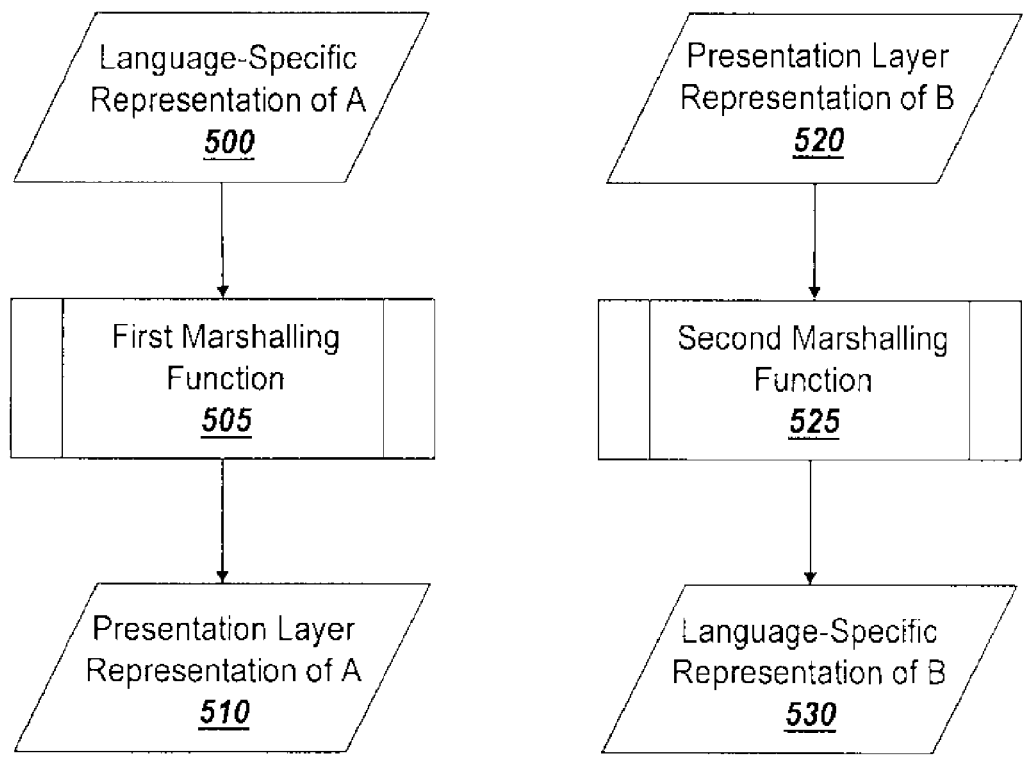
FIG. 5 is a schematic diagram illustrating operation of a first and a second marshalling function, according to another aspect of an exemplary embodiment.

FIG. 5 is a schematic diagram illustrating two complimentary marshalling functions according to aspects of an exemplary embodiment. A variable "A" exists as a language-specific representation of an object in computer memory 500. The address in memory of the language-specific representation of "A" is passed to a first marshalling function 505. The first marshalling function 505 produces an address of a presentation layer representation of "A" 510. The debugging technique may then use the presentation layer representation of "A" 510 for displaying and modifying the variable while the program is executing. The second (complimentary) marshalling function 525 takes the address of a presentation layer representation of an object "B" and the name of the object 520 as input and returns the address of the language-specific representation of "B" as an output 530. Second marshalling function 525 may then be used to change a value of a language-specific representation of a variable based on changing the value of a presentation layer representation of the variable.

For example, marshalling from a C (language-specific) data format for a real scalar double to a MATLAB (presentation layer) data format (as required for the example program presented above) may be implemented using the following C function:

```
01    static const mxArray *m_emlrt_marshallOut (real_T eml_u)
02    {
03        const mx Array *eml_y;
04        const mxArray *eml_m0;
05        eml_y = NULL;
06        eml_m0 = mxCreateDoubleScalar (eml_u);
07        emlrtAssign (&eml_y, eml_m0);
08        return eml_y;
09    }
```

First marshalling function 505 takes only one input; the C (language-specific) representation of a real, scalar double, which is type real_T. First marshalling function 505 converts the C representation to the MATLAB (presentation layer) representation using a MATLAB support function. First marshalling function 505 then returns the MATLAB representation, which is an mxArray.

A different second marshalling function 525 is used to marshal from the MATLAB (presentation layer) representation for a real, scalar double to the C (language-specific) format. The second marshalling function 525 may be implemented using the following C function:

```
01    static real_T m_b_emlrt_marshallIn (const mzArray
          *eml_src, char *eml_nam)
02    {
03        real_T eml_ret;
04        emlrtCheckBuiltIn (eml_nam, eml_src, "double", false, 0U, 0);
05        eml_ret = *(real_T *) mxGetData (eml_src);
06        emlrtDestroyArray (&eml_src);
07        return eml_ret;
08    }
```

This second marshalling function takes two inputs: a pointer to the MATLAB representation of a real, scalar double, which is an mxArray, and the MATLAB name of an object being marshalled. The second marshalling function returns the C representation of a real, scalar double, which is real_T. The second marshalling function first verifies that the input object is of the expected type, a real, scalar double, then uses a MATLAB support function to extract the value in C format. Marshalling functions are just one example of a technique to implement "opaque" data objects for use in a debugger according to aspects of an exemplary embodiment. When viewing and manipulating "opaque" data objects, the debugger may not need to have information about how to display objects that are different variable types because "opaque" data objects, which are presentation layer representations of objects, may already be formatted for display.

Figure 6A:
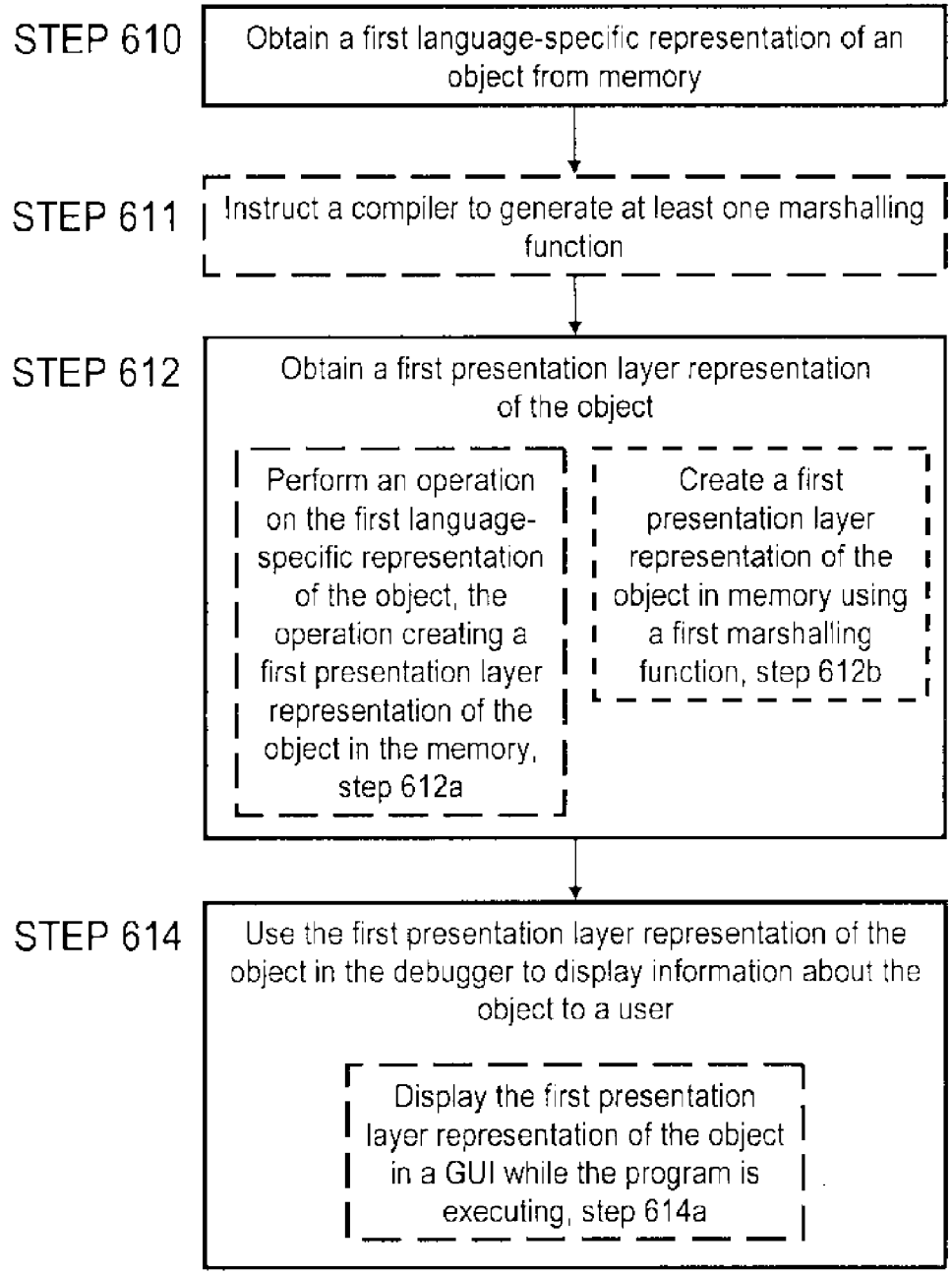
FIG. 6A is a flow chart illustrating a technique for debugging a program according to an aspect of an exemplary embodiment.

FIG. 6A is a flowchart depicting the steps performed in debugging a program using a debugger in a computing device that provides a programming environment with a presentation layer according to an exemplary embodiment. In FIGS. 6A to 6D dotted outlines indicate steps that may be performed as part of a debugging technique or process, according to aspects of an exemplary embodiment. The steps are discussed with respect to exemplary programming environment 307 depicted in FIG. 3A and exemplary debugger 70 depicted in FIGS. 2A and 2B solely for illustrative purposes.

During halted execution of program 62, a programmer requests display of a value of a program object 30. Objects used by the program 62 being debugged are stored in memory 64. Initially, a first language-specific representation 32 of an object 30 in memory 64 is obtained (step 610). A location 67b of language-specific the representation 32 of object 30 in memory 64, and a location 67c of LS-PL conversion functions 65a, 65b in memory 64 may be read from the exemplary symbol table 66, and then language-specific representation 32 may be read from memory 64 at the specified location 67b.

A first presentation layer representation 69 of the object in memory 64 is obtained (step 612). Obtaining a first presentation layer representation 69 of the object in the memory 64 (step 612) may include an operation performed on the first language-specific representation 62 of the object, the operation creating a first presentation layer representation 69 of the object in the memory (step 612a). The operation may include sending the language-specific representation 32 of the object to the LS to PL conversion function 65a, which outputs presentation layer representation 39 as depicted in FIG. 2B. According to aspects of an exemplary embodiment, the first presentation layer representation 39 of the object in the memory 64 may be created using a first marshalling function 505 (step 612b), which is illustrated in FIG. 5.

According to other aspects of an exemplary embodiment, a compiler may be instructed to generate at least one marshalling function on demand (step 611). Although, instructing the compiler to generate marshalling functions (step 611) is depicted in FIG. 6A as occurring after a first language-specific representation 32 is obtained (step 610) and before a first presentation layer representation 69 is obtained (step 612), the compiler may be instructed to generate marshalling functions at a different point the debugging technique or at multiple points in the debugging technique. For example, the compiler may be instructed to generate at least one marshalling function before beginning other steps in debugging, and/or the compiler may be instructed to generate marshalling functions in the midst of the other debugging steps.

The compiler may be instructed to generate marshalling functions for less than all of the data types in the program. Any given application may have an arbitrarily large number of data types, particularly if the programming language supports user-defined types. It may not always be desirable to instruct the compiler to pre-generate marshalling functions for all data types in the source program. Instead, the debugger may invoke the target compiler on demand to compile only the needed marshalling functions, which may then be cached and associated with the program under test. According to other aspects of an illustrative embodiment, at least one marshalling function, which includes the first marshalling function, may be automatically generated by a compiler when a source program is compiled in a debug mode. An exemplary embodiment may include both "automatic" marshalling function generation and "on demand" marshalling function generation. For example, some marshalling functions may be "automatically" generated when a source program is compiled, and some marshalling functions may be generated "on demand" only if needed.

The compiler that is instructed to generate at least one marshalling function may include a translator and/or an interpreter. As discussed above, the term "compiler" as used herein refers to a program or programs that translate source code from a high level language to a lower level language, and a program or programs that translate between high level languages including translators, language converters and interpreters.

The generated marshalling functions may be stored in the load file of the program. The symbol table 66 of the program may include the addresses of the marshalling functions associated with each object in the program allowing the debugger to locate the relevant marshalling functions for any of the objects by accessing the symbol table 66. Alternately, the symbol table 66 may only include the addresses of the marshalling functions that have been generated if marshalling functions have not been generated for all of the objects in the program. Additionally, the marshalling functions may be loaded and executed in the same processing environment as the program under test, and/or the marshalling functions may be loaded and executed in a separate processing environment. Thus, for example, if the target processing environment is a memory constrained embedded system, no space need be used for marshalling functions if an alternate processing environment, such as simulator, is available.

After the presentation layer representation 39 is obtained, exemplary debugger 70 uses the presentation layer representation 39 of the object to display information about the object 30 on the display 68 (step 614). Using the first presentation layer 39 representation of the object in the debugger 70 to display information about the object 30 on the display 68 (step 614) may include displaying the first presentation layer representation 39 of the object in a GUI while the program 62 is executing (step 614a). Exemplary debugger 70 may use the programming environment presentation layer 69 to display the presentation layer representation 39 of the object on the display 68.

Figure 6B:
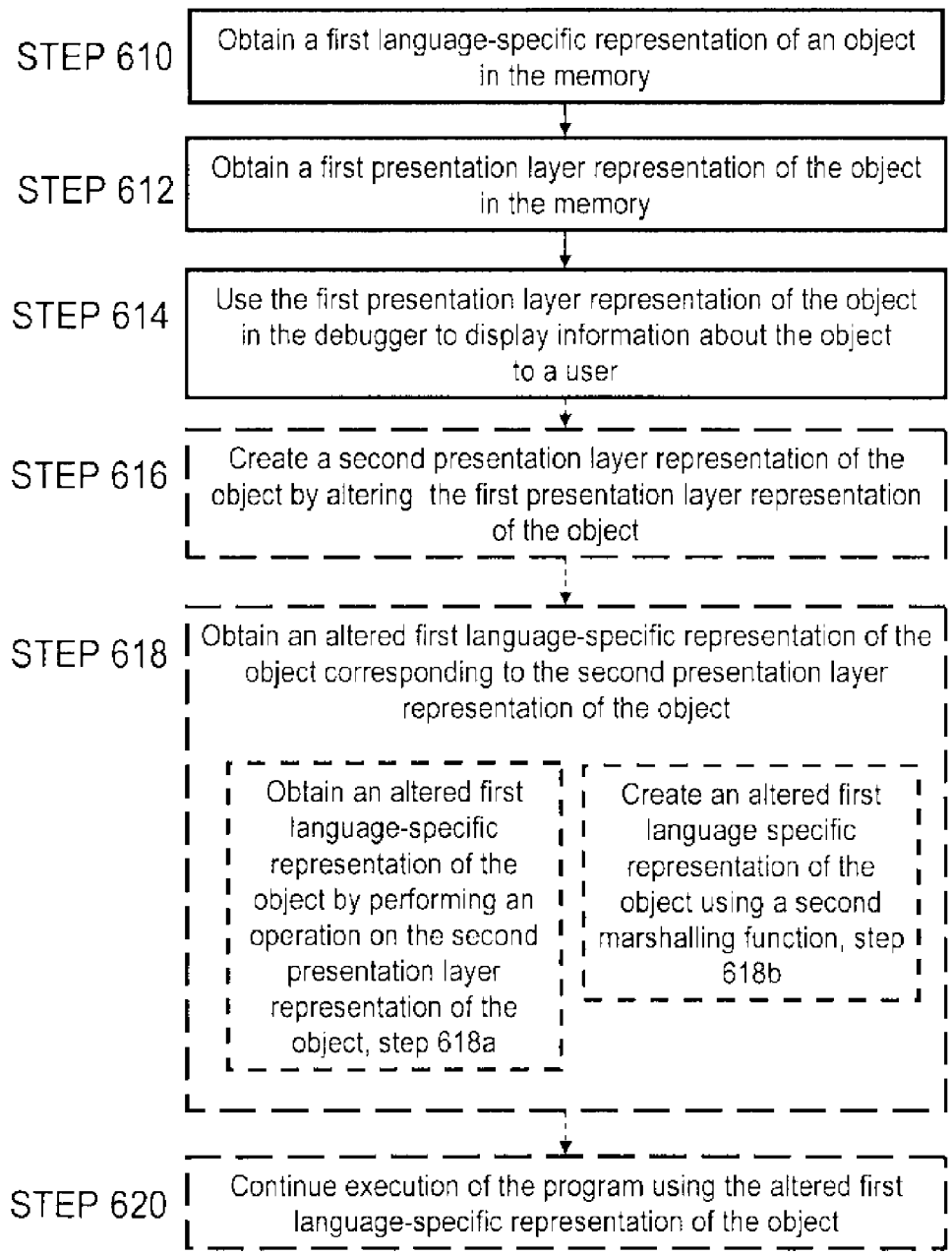
FIG. 6B is a flow chart illustrating alternative techniques that may be used for debugging a program that allow a user to modify run-time values during execution, according to further aspects of an exemplary embodiment.

FIG. 6B is a flowchart depicting additional steps that may be performed for debugging a program. In addition to displaying information about an object, a debugger may enable a programmer to change the value of a program object during execution. After the first presentation layer representation of the object in the debugger is used to display information about the object to a user (step 614), the first presentation layer representation of the object may be altered to create a second presentation layer representation of the object (step 616). An altered first language specific-representation of the object corresponding to the second presentation layer representation of the object may be obtained (step 618). As depicted in FIG. 6D, obtaining an altered first language-specific representation of the object corresponding to the second presentation layer representation of an object (step 618) may include performing an operation on the second presentation layer representation of the object, the operation creating an altered first language-specific representation of the object (step 618a) and/or creating an altered first language-specific representation of the object using a second marshalling function (step 618b). Additionally, the execution of the program may continue using the altered first language-specific representation of the object (step 620). This technique allows a user to modify the value of a presentation layer representation of an object during execution and have the program resume execution using a correspondingly altered language-specific value of the object.

The exemplary technique of FIG. 6B is described for illustrative purposes with reference to the simple program of compiled C code (the identity function described previously) executed within the MATLAB programming environment. As illustrated in FIG. 4C, a user may enter a different value 416 for presentation layer (MATLAB) representation of the object ("u") by entering a new assignment statement in the command line (as shown), or by any other suitable technique for entering information using a GUI (step 416), which results in an altered value 418 of the presentation layer representation of the object. The debugger 70 may then consult a symbol table 66 to locate the address 67c in memory of a second marshalling function 525 associated with the object ("u") and the address 67b in memory of the language-specific (run-time C) representation of the object ("u"). As discussed above, second marshalling 525 (an example of a PL to LS conversion function 65*b* depicted to FIG. 2B) is a marshalling function that converts a presentation layer representation of an object to a corresponding language-specific representation of the same object for a particular object type. The debugger 70 then passes the name of the object "u" and the address of the value of the altered presentation layer (MATLAB) representation to second marshalling function 525. Second marshalling function 525 returns an altered language-specific (C language) value corresponding to the altered presentation layer value. The address in memory of the value of the language-specific (run-time C) representation of "u" is assigned the changed language-specific (C language) value, which sets the language-specific (run-time C) representation to have the altered language-specific value, corresponding to steps 618 and 618*b*. When the program resumes execution, it uses the altered language-specific (run-time C) representation value, corresponding to step 620.

Figure 6C:
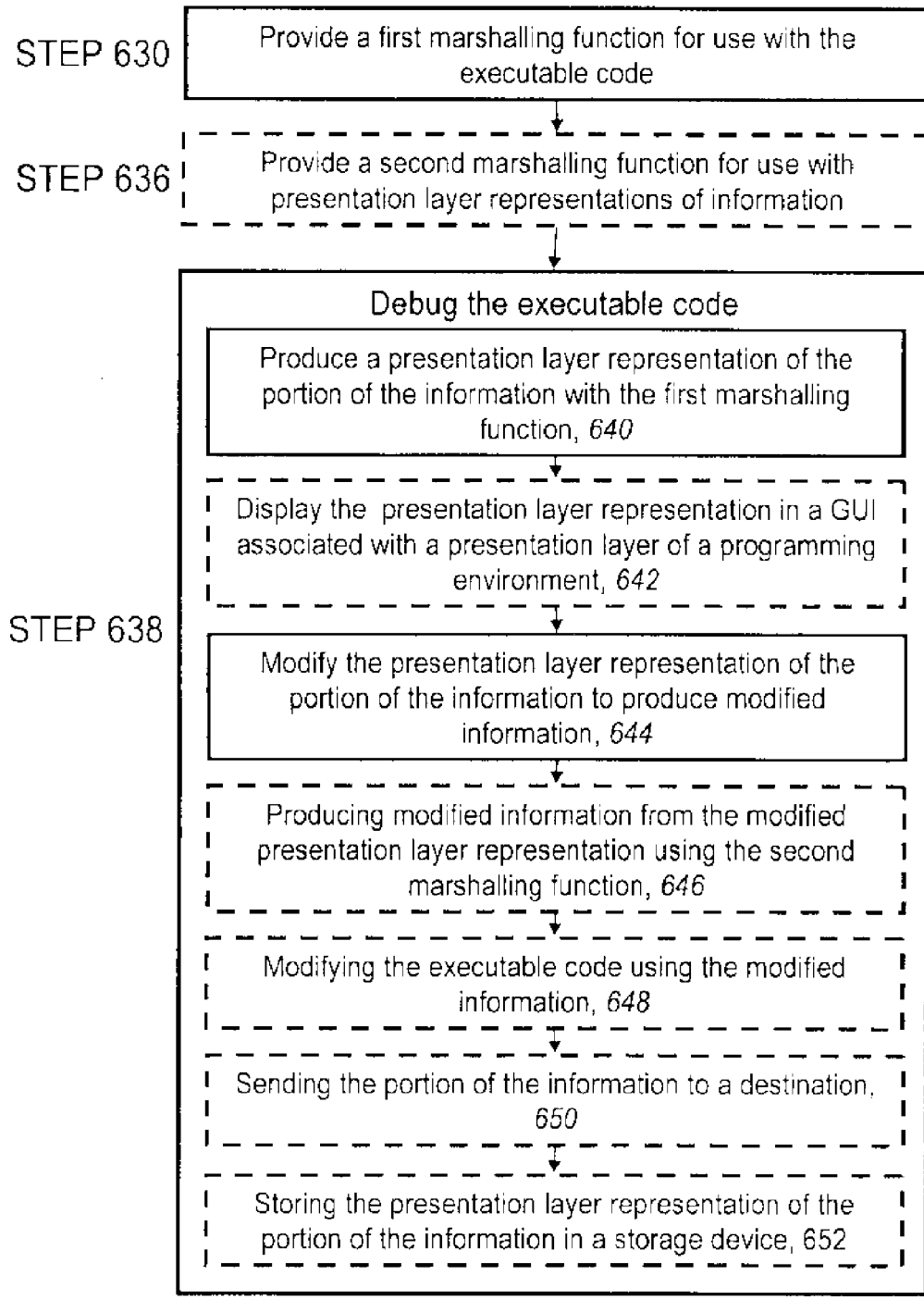
FIG. 6C is a flow chart illustrating a technique for debugging a program using marshalling functions, according to aspects of an exemplary embodiment.

FIG. 6C is a flowchart depicting the steps performed in debugging a program using a debugger, according to aspect of an exemplary embodiment. As described above, executable code manipulates information. A data object is any portion of said information that a programmer or user would like to access, view or modify in the debugging process. An exemplary debugging technique may be performed on a computing device having a programming environment 307 that includes a presentation layer 305. Initially, a first marshalling function that receives a portion of information that is manipulated by the executable code and produces a presentation layer representation of the portion of the information is provided (step 630). The presentation layer of the portion of the information is compatible with the debugger. According to aspects of an exemplary embodiment, a second marshalling function that receives a presentation layer representation of information and produces corresponding information in a format compatible with the executable code may also be provided (step 636). The presentation layer representation of the portion of information and the presentation layer representation of the corresponding information may be compatible with the presentation layer 305 of the programming environment 307.

The executable code is debugged (step 638). A presentation layer representation of a portion of information is produced using the first marshalling function (step 640), where the portion of information is a portion of the information manipulated by the executable code. The presentation layer representation of a portion of the information may be displayed in a graphical user interface (GUI) associated with the presentation layer 305 of the programming environment 307.

The presentation layer representation of the portion of the information is modified to produce modified information (step 644). The modified information may be produced from the modified presentation layer representation using the second marshalling function (step 646). The modified information may be used to modify the executable code (step 648). The modified information may be sent to a destination using the presentation layer representation of the modified information or using another representation of the modified information that differs from the presentation layer representation (step 650). The presentation layer representation of the portion of the information or of the modified information may be stored in a storage device (step 652).

FIG. 6D depicts two steps that may be included in providing a first marshalling function (step 630), according to aspects of an illustrative embodiment. Code may be compiled in debug mode to generate one or more marshalling functions where the one or more marshalling functions include the first marshalling function (step 632). Marshalling functions may be generated for all of the data types of the portions of information manipulated by the executable code during code compiling in debug mode. Alternatively, marshalling functions may be generated for only a predetermined set of the data types that includes less than all of the data types of the portions of information manipulated by the executable code during code compiling in debug mode. The predetermined set may be based on user or programmer input or may be a default predetermined set. A compiler may be instructed to generate at least one marshalling function where the at least one marshalling function includes the first marshalling function (step 634). The instruction to the compiler may be "on demand" in response to input from a user, a programmer or another source which identifies which marshalling functions to generate.

Another exemplary embodiment may include a computer-readable medium holding executable instructions that when executed debug executable code. The executable instructions may include instructions for performing any of the exemplary debugging techniques described herein, or any other techniques falling within the scope of the invention. The instructions may be executed on a computing device as described with respect to FIG. 7A.

Figure 7A:
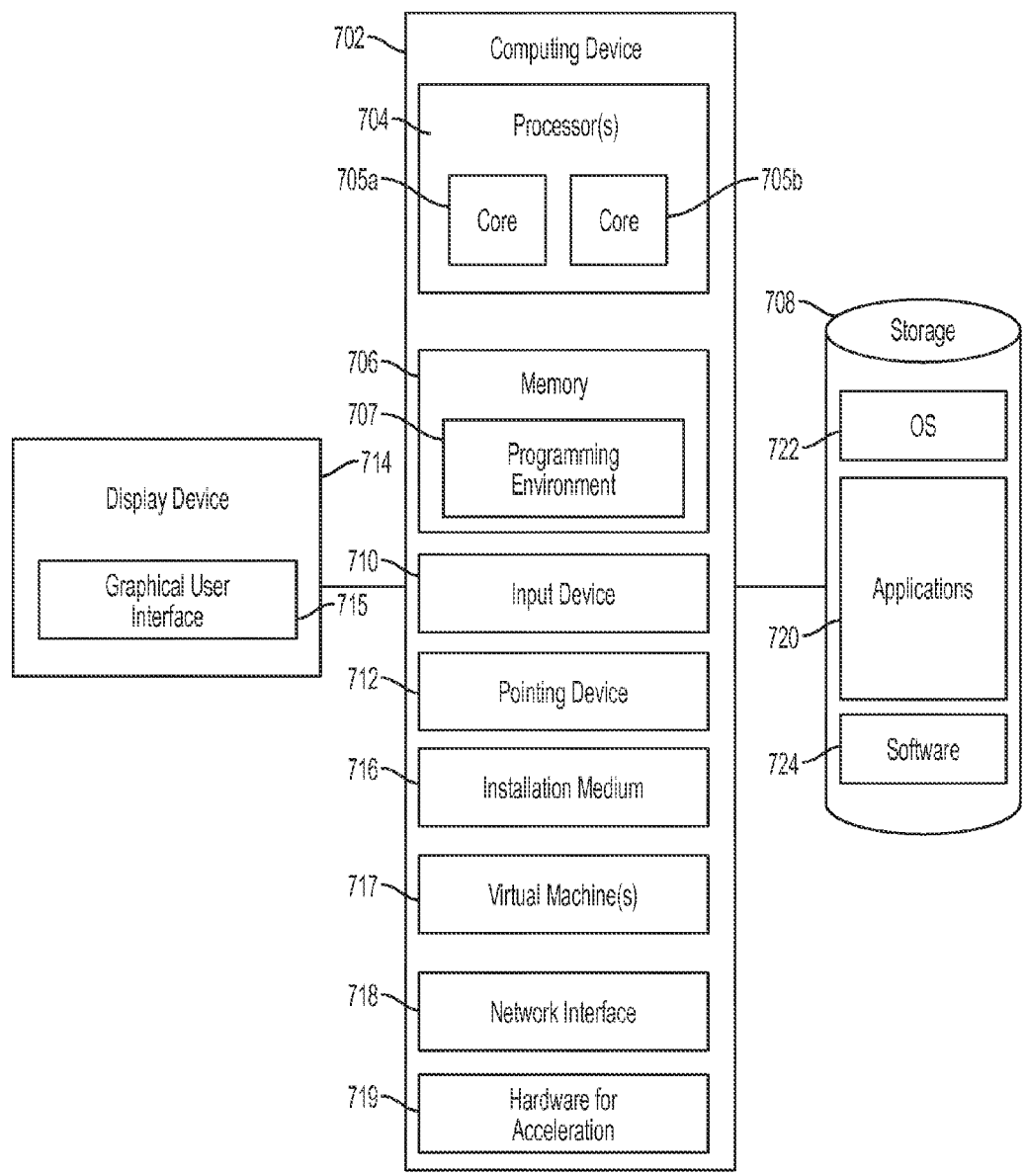
FIG. 7A is a schematic diagram of an exemplary computing device for practicing exemplary embodiments.

FIG. 7A depicts an environment suitable for practicing an exemplary embodiment. The environment includes a computing device 702 having memory 706, on which software according to one exemplary embodiment may be stored, a processor (CPU) 704 for executing software stored in the memory 706, and other programs for controlling system hardware. Optionally, the computing device 702 may include multiple CPUs 704 for executing software loaded in the memory 706, and other programs for controlling system hardware. Each of the CPUs may be a single or a multiple core processor 705*a*, 705*b*.

Computing device 702 may support any suitable device readable medium 716 for installing software programs, such as a CD-ROM, DVD-ROM, floppy disk, tape device, USB device, hard-drive, etc. Computing device 702 may further include a storage device 708, such as a hard-drive or CD-ROM, for storing an operating system 722 and other related software 724, applications 720 and executable instructions. Programming environment 307 which executes in memory 706 may be provided by one or more applications 720 installed via a device readable medium 716 and stored in the storage device 708. Additionally, the operating system and the applications 720 that provide programming environment 307 may be run from a bootable CD, such as, for example, KNOPPIX®, a bootable CD for GNU/Linux.

Memory 706 may include a computer system memory or random access memory (RAM) such as dynamic random access memory (DRAM), static random access memory (SRAM), extended data out dynamic random access memory (EDO RAM), etc. Memory 706 may include other types of memory as well, or combinations thereof. Code loaded in memory 706 (which may include code for software 724 or applications 720) may run in a virtualized environment, such as in a Virtual Machine (VM) 717. Multiple VMs may be resident on a single processor. Also, part of the software 724 or applications 720 may be run in hardware, for example, by configuring a field programmable gate array (FPGA) or creating an application specific integrated circuit (ASIC). Further, part of the application may be run on analog electronic devices or other resources may be used to run part of the application, such as graphics processing units (GPUs) or dedicated hardware such as Fast Fourier Transform (FFT) processing hardware. Additionally, the computing device 702 may include a hardware accelerator 719.

A programmer may interact with computing device 702 through a display device 714 such as a computer monitor, which may be used to display a graphical user interface (GUI) 715. Computing device 702 may include other I/O devices 710 such a keyboard and/or a pointing device 712, for example a mouse, for receiving input from a user. Optionally, the I/O devices 710 and the pointing device 712 may be connected to display device 714. Additionally, computing device 702 may include any type of input device for receiving user input, such as a joystick. In other exemplary embodiments, computing device 702 may include any type of haptic or tactile feedback device, such as a vibration generating mouse, or a force feedback device such as a force feedback joystick. Also, computing device 702 may include any type of sound producing I/O device such as any suitable sound card. Computing device 702 may include other suitable conventional I/O peripherals.

Network interface 718 may include a built-in network adapter, network interface card, PCMCIA network card, card bus network adapter, wireless network adapter, USB network adapter, modem or any other device suitable for interfacing computing device 702 to any type of network capable of communication and performing the operations described herein. Moreover, the computing device 702 may be any computer system such as a workstation, desktop computer, server, laptop, handheld computer or other form of computing or telecommunications device that is capable of communication and that has sufficient processor power and memory capacity to perform the operations described herein.

Figure 7B:
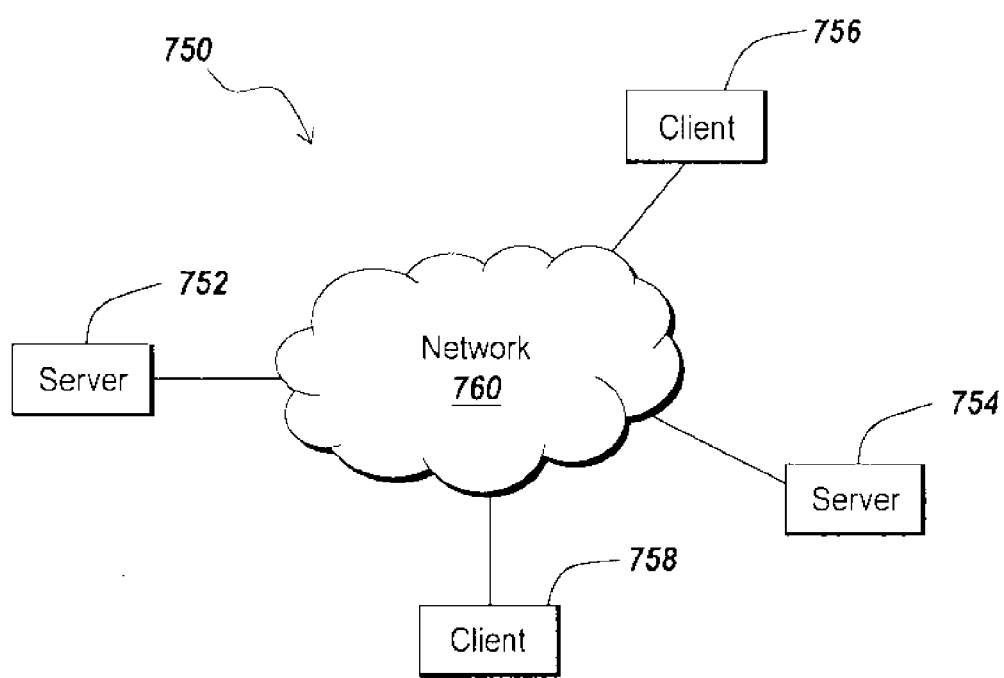
FIG. 7B depicts an exemplary distributed system suitable for practicing a distributed implementation of an exemplary embodiment.

FIG. 7B depicts an exemplary network environment 750 suitable for the distributed implementation of an exemplary embodiment. The network environment 750 may include one or more servers 752 and 754 coupled to clients 756 and 758 via a communication network 760. In one implementation, the servers 752 and 754 and/or the clients 756 and/or 758 may be implemented via the computing device 702. Network interface 718 of the computing device 702 enables the servers 752 and 754 to communicate with the clients 756 and 758 through the communication network 760. Communication network 760 may include Internet, intranet, LAN (Local Area Network), WAN (Wide Area Network), MAN (Metropolitan Area Network), wireless network (e.g., using IEEE 802.11 or Bluetooth), etc. In addition network 760 may use middleware, such as Common Object Request Broker Architecture (CORBA) or Distributed Component Object Model (DCOM) to allow a computing device on the network 760 to communicate directly with another computing device that is connected to network 760.

Figure 8:
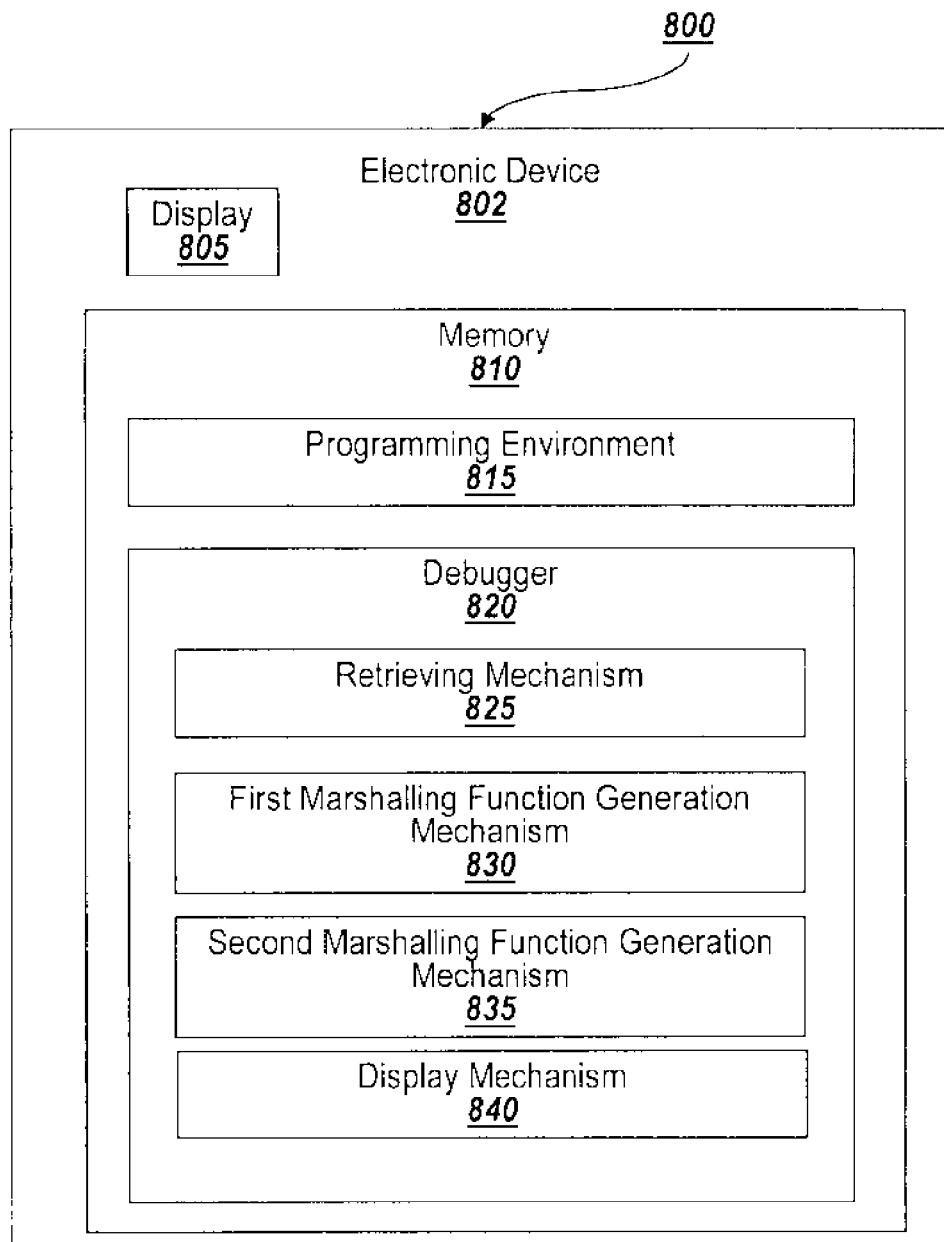
FIG. 8 is a schematic diagram of an exemplary system for debugging that includes a retrieving mechanism, a representation conversion mechanism, and a display mechanism, according to aspect of an exemplary embodiment.

FIG. 8 depicts a system 800 for debugging a program, according to aspects of another exemplary embodiment. The system includes an electronic device 802 with a display 805 and memory 810. System 802 also includes a programming environment 815 with a presentation layer and a debugger 820. Debugger 820 includes a retrieving mechanism 825 for obtaining a portion of information from the memory, where the portion of information is a portion of the information manipulated by executable code being debugged. Retrieving mechanism 825 may include a mechanism for accessing a symbol table 66 to determine an address in memory of the portion of the information, which is an address in memory of the language-specific representation of the object. Debugger 820 also includes a first marshalling function generation mechanism 830 where the first marshalling function receives the portion of the information and produces a presentation layer representation of the portion of the information. The debugger may also include a second marshalling function generation mechanism 835 where the second marshalling function receives a presentation layer representation of information and produces corresponding information that is compatible with the executable code. The first marshalling function generation mechanism may instruct a compiler to generate at least one marshalling function. The debugger also includes a display mechanism 840 for displaying the presentation layer representation of the portion of the information to the user. Display mechanism 840 may communicate with the programming environment presentation layer to display the presentation layer representation of the portion of the information.

Although the present invention has been described with reference to the example embodiments illustrated in the figures, it should be understood that many alternative forms may embody the present invention. It is, therefore, expressly noted that the present invention is not limited to these exemplary embodiments, but rather the intention is that additions and modifications to what is expressly described herein also are included within the scope of the invention. Moreover, it is to be understood that the features of the various exemplary embodiments described herein are not mutually exclusive and may exist in various combinations and permutations, even if such combinations or permutations are not made express herein, without departing from the spirit and scope of the invention.

What is claimed is:

1. A method comprising:
   generating, by one or more processors, using a compiler in a programming environment, a first marshalling function, the first marshalling function being generated automatically or based on a request from a debugger, the debugger operable to debug executable code including one or more program objects; and
   debugging, by the one or more processors, using the debugger, the executable code, wherein the debugging includes:
   accessing data objects, wherein one or more of the data objects:
   has one or more corresponding language-specific representations,
   possibly has different language-specific representations,
   has one or more presentation-layer representations compatible with the debugger, the one or more presentation-layer representations representing one or more of the data objects in a form of opaque data objects that are formatted for display, and
   is associated with at least one program object,
   converting a data object of the data objects, using the first marshalling function, from a language-specific representation to a presentation-layer representation,
   providing the presentation-layer representation of the data object to the debugger or associating the language-specific representation of the data object to a program object, and
   interacting with a presentation layer to display or receive the data object in the presentation-layer representation, where the presentation layer:
   is external to the debugger, and
   is capable of displaying opaque data objects.

2. The method of claim 1, wherein the debugging further comprises:

sending a portion of the one or more data objects to a destination, wherein the portion of the one or more data objects is sent using the presentation-layer representation of the one or more data objects or using another representation of the portion of the one or more data objects that differs from the presentation-layer representation.

3. The method of claim 1, wherein the debugging further comprises:
storing the presentation-layer representation of the one or more data objects a storage device.

4. The method of claim 1, further comprising:
providing a second marshalling function for use with presentation-layer representations of the one or more data objects, wherein the second marshalling function receives a presentation-layer representation of the one or more data objects and produces one or more corresponding data objects in a format compatible with the executable code.

5. The method of claim 4, further comprising:
modifying the executable code using the one or more corresponding data objects in a format compatible with the executable code.

6. The method of claim 1, further comprising:
instructing the compiler to generate at least one marshalling function, wherein the at least one marshalling function includes the first marshalling function.

7. The method of claim 1, further comprising:
compiling a program in a debug mode using the debugger to generate one or more marshalling functions that include the first marshalling function.

8. The method of claim 1, wherein the debugging further comprises:
displaying the presentation-layer representation of the data object in a graphical user interface (GUI) associated with a presentation layer of a programming environment.

9. The method of claim 1, wherein the presentation-layer representation is compatible with a presentation layer of a programming environment for the executable code.

10. The method of claim 1, wherein at least one of the one or more language-specific representations is incompatible with the debugger such that a corresponding data object cannot be displayed.

11. A system comprising:
one or more processors; and
a memory coupled to the one or more processors, the memory comprising instructions operable to instruct the one or more processors to execute:
a programming environment with a compiler and a presentation layer,
a first marshalling function, the first marshalling function being generated automatically or based on a request from a debugger, wherein the debugger is operable to:
debug executable code including one or more program objects,
access data objects, wherein one or more of the data objects:
has one or more corresponding language-specific representation,
possibly has different language-specific representations,
has one or more presentation-layer representations compatible with the debugger, the one or more presentation-layer representations representing one or more of the data objects in a form of opaque data objects that are formatted for display, and
is associated with at least one program object,
convert a data object of the data objects, using the first marshalling function, from a language-specific representation to a presentation-layer representation,
provide the presentation-layer representation of the data object to the debugger or associating the language-specific representation of the data object to a program object, and
interact with a presentation layer to display or receive the data object in the presentation-layer representation, where the presentation layer:
is external to the debugger, and
is capable of displaying opaque data objects.

12. The system of claim 11, wherein the memory further comprises instructions to:
send a portion of the one or more data objects to a destination, wherein the portion of the one or more data objects is sent using the presentation-layer representation of the one or more data objects or using another representation of the portion of the one or more data objects that differs from the presentation-layer representation.

13. The system of claim 11, wherein the memory further comprises instructions to:
store the presentation-layer representation of the one or more data objects in a storage device.

14. The system of claim 11, wherein the memory further comprises instructions to:
provide a second marshalling function for use with presentation layer-representations of the one or more data objects, wherein the second marshalling function receives a presentation-layer representation of the one or more data objects and produces one or more corresponding data objects in a format compatible with the executable code.

15. The system of claim 14, wherein the memory further comprises instructions to:
modify the executable code using the one or more corresponding data objects in a format compatible with the executable code.

16. The system of claim 11, wherein the memory further includes:
instructions to instruct the compiler to generate at least one marshalling function, wherein the at least one marshalling function includes the first marshalling function.

17. The system of claim 11, wherein the memory further includes:
instructions to compile a program in a debug mode using the debugger to generate one or more marshalling functions that include the first marshalling function.

18. The system of claim 11, wherein the memory further includes:
instructions to display a presentation-layer representation of an object in a graphical user interface (GUI) associated with a presentation layer of a programming environment.

19. The system of claim 11, wherein the presentation-layer representation is compatible with a presentation layer of a programming environment for the executable code.

20. A non-transitory computer-readable medium comprising computer-executable instructions to:

generate, using a compiler in a programming environment, a first marshalling function, the first marshalling function being generated automatically or based on a request from a debugger, the debugger operable to debug executable code including one or more program objects;

debug, using the debugger, the executable code;

access data objects, wherein one or more of the data objects:
- has one or more corresponding language-specific representations,
- possibly has different language-specific representations, at least one of the one or more language-specific representations being incompatible with the debugger such that a corresponding data object cannot be displayed,
- has one or more presentation-layer representations compatible with the debugger, the one or more presentation-layer representations representing one or more of the data objects in a form of opaque data objects that are formatted for display, and
- is associated with at least one program object;

convert a data object of the data objects, using the first marshalling function, from a language-specific representation to a presentation-layer representation;

provide the presentation-layer representation of the data object to the debugger or associating the language-specific representation of the data object to a program object; and interact with a presentation layer to display or receive the data object in the presentation-layer representation, where the presentation layer:
- is external to the debugger, and
- is capable of displaying opaque data objects.

* * * * *

UNITED STATES PATENT AND TRADEMARK OFFICE
CERTIFICATE OF CORRECTION

PATENT NO. : 9,582,398 B1
APPLICATION NO. : 14/570480
DATED : February 28, 2017
INVENTOR(S) : John Elliott et al.

Page 1 of 1

It is certified that error appears in the above-identified patent and that said Letters Patent is hereby corrected as shown below:

In the Claims

In Claim 3, Column 19, Line 11, "objects a storage device" should be --objects in a storage device--.

Signed and Sealed this
Twenty-third Day of May, 2017

Michelle K. Lee
*Director of the United States Patent and Trademark Office*